United States Patent [19]
Davis, III et al.

[11] Patent Number: 5,870,739
[45] Date of Patent: Feb. 9, 1999

[54] HYBRID QUERY APPARATUS AND METHOD

[75] Inventors: James R. Davis, III, Pleasant Grove; Daniel S. Sanders, Orem; Scott W. Pathakis, Sandy; W. Brent Bradshaw; Brian L. Jensen, both of Pleasant Grove; Andrew A. Hodgkinson, Orem, all of Utah

[73] Assignee: Novell, Inc., Provo, Utah

[21] Appl. No.: 751,540

[22] Filed: Nov. 15, 1996

Related U.S. Application Data

[60] Provisional application No. 60/026,892, Sep. 20, 1996.

[51] Int. Cl.⁶ .................................................. G06F 17/30
[52] U.S. Cl. .................................................. 707/4
[58] Field of Search .................................................. 707/4

[56] References Cited

U.S. PATENT DOCUMENTS

| | | | |
|---|---|---|---|
| 4,648,036 | 3/1987 | Gallant | 364/300 |
| 4,714,995 | 12/1987 | Materna et al. | 364/200 |
| 4,939,689 | 7/1990 | Davis et al. | 364/900 |
| 5,081,608 | 1/1992 | Tamura et al. | 395/600 |
| 5,257,366 | 10/1993 | Adair et al. | 395/600 |
| 5,412,806 | 5/1995 | Du et al. | 395/600 |
| 5,418,943 | 5/1995 | Borgida et al. | 395/600 |
| 5,442,784 | 8/1995 | Powers et al. | 395/600 |
| 5,444,615 | 8/1995 | Bennett et al. | 705/8 |
| 5,469,354 | 11/1995 | Hatakeyama et al. | 707/3 |
| 5,499,358 | 3/1996 | Nevarez | 395/600 |
| 5,511,186 | 4/1996 | Carhart et al. | 395/600 |
| 5,517,407 | 5/1996 | Weiner | 704/1 |
| 5,550,966 | 8/1996 | Drake et al. | 707/104 |
| 5,634,051 | 5/1997 | Thomson | 707/5 |
| 5,649,183 | 7/1997 | Berkowitz et al. | 707/6 |
| 5,701,459 | 12/1997 | Millett et al. | 707/3 |
| 5,708,806 | 1/1998 | DeRose et al. | 707/104 |

OTHER PUBLICATIONS

Paepcke, An Object–Oriented View Onto Public Heterogeneous Text, Proc. Ninth International Conference on Data Engineering, pp. 484–493, 19–23 Apr. 23, 1993.

A11 mitpr002.0003, MIT Press, 1980.
A12 IBM Technical Disclosure Bulletin, vol. 26 No. 8, Jan. 1984, pp. 4349–4354, entitled "Table Processing".
A13 hp300208.0153, Hewlett Packard, Dec., 1988.
A14 Dr. Dobbs Journal, Nov. 1991, pp. 150 and 152.
A15 hp300121.0026, Hewlett Packard, Jul. 1992.
A16 hp600127.0026, Hewlett Packard, Jul. 1992.
A17 hp700133.0026, Hewlett Packard, Jul. 1992.
A18 hp300101.0130, Hewlett Packard, Aug. 1992.
A19 hp300101.0249, Hewlett Packard, Aug. 1992.
A20 hp300122.0078, Hewlett Packard, Sep. 1992.
A21 "Querying Semistructured Heterogeneous Information", Stanford University, 1994, D. Quass et al.
A22 IBM technical Disclosure bulletin, vol. 38 No. 03, Mar. 1995, pp. 13–18, entitled "Parci Architecture".
A23 "Querying Semistructured Heterogeneous Information", Stanford University, 1995, D. Quass et al.
A24 "The Lorel Query Language for Semistructured Data", Stanford University, 1996, S. Abiteboul et al.
A25 "LORE: A Lightweight Object REpository for Semistructured Data", Stanford University, 1996, D. Quass et al.
A26 "Querying Semi–Structured Data", S. Abiteboul, 1996.

*Primary Examiner*—Wayne Amsbury
*Attorney, Agent, or Firm*—Madson & Metcalf, P.C.

[57] ABSTRACT

A method and apparatus disclosed may be implemented in a digital computer to query a set of arbitrarily structured records. Arbitrarily structured records are structured differently from each other. A query engine, query structure, operators of conventional and non-conventional types may be used in formulating a query. The apparatus may evaluate records having missing fields, repeating fields, or an UNKNOWN value arising from a missing field, division by zero, modulo by zero, or the like. New aggregator (e.g. universal quantifier and existential quantifier) and selector operators (e.g., first, last, nth) may distill multiple values to return a single value. To evaluate a query, the search engine may implement filtered indices, alternate-key indices, compound alternate-key indices, hybrid queries having both full-text and non-full text operands, and joinder of records. Certain of these features may be implemented for evaluating records from both prior art databases and heterogeneous databases of arbitrarily structured records.

15 Claims, 13 Drawing Sheets

HYBRID QUERY APPARATUS AND METHOD

RELATED APPLICATIONS

This application is a continuation of co-pending U.S. Provisional patent application Ser. No. 60/026,892 filed Sep. 20, 1996.

BACKGROUND

1. The Field of the Invention

This invention relates to databases and more particularly, to novel systems and methods for structuring queries and indices, and executing queries for databases.

2. The Background Art

Database methodologies, developing for decades, now include relational, object-oriented, and heterogeneous types. Heterogeneous databases have arbitrarily structured records.

Ubiquitous personal computing, collaborative group computing, and highly integrated, distributed environments create new demands on databases. Databases store information, that is most useful when retrieved completely, reliably, and quickly.

Records (or combinations of records) in a database generally represent an object in the real world (a product, a customer, an employee, a business division, etc.). As such, a record typically consists of a collection of fields that represent attributes of the object. This collection of fields is not necessarily "complete," but has been deemed sufficiently useful to describe the object and distinguish it from any other object represented in the database. Ultimately, the contents of these fields is the information that distinguishes one object from another object.

By way of example, traditionally, databases use schema to define record "types" or object classes. In such databases, a record type (or object class) is an abstraction or generalization about the collection of records in the database that represents the same "kind" of real world object. As such, a record "type" may be thought of as "meta-data," or "data about data." A record type typically defines certain relevant attributes and/or behaviors that are to be found in instances of that record type. For example, the record type "person" may specify that a "person" record contains attributes of height, weight, hair color, phone number, etc. The set of "person" records in the database is homogeneous in that each record contains exactly the same set of attributes (those that are defined in the "person" record type).

The rigid structures, incompatibility with modern programming languages and methodologies, and the inability to represent and manage complex data masses have contributed to increasing dissatisfaction of users with the performance of relational databases. Meanwhile, the need exists to extend relational database systems with some kind of support for large and internally complex data as well as object-oriented data. Although object-oriented databases have not displaced relational databases in the software market to any major extent, neither relational nor object-oriented databases solve all of the problems that need to be addressed for users.

An additional difficulty is the need to build data into databases as the data becomes available. Thus, imposing structure on a database at the time of its creation is not always practical nor useful. Data may arrive from many sources at a central collecting point. The data may tend to be somewhat amorphous. Context may be known based upon information within or without a data mass. A database has been created to store arbitrarily structured, persistent data, along with any content and context associated with the data. What is needed is an apparatus and method to efficiently query a database containing arbitrarily structured records.

For example, in an arbitrarily structured record, repeating fields, missing fields, null-valued fields, and sub-record entities may exist. A database containing arbitrarily structured records presents numerous difficulties for a query engine designed to locate records within the database.

Internal self-description exists within arbitrarily structured records since no over-riding schema need exist, as compared with relational databases. Thus, data may not always be cleanly divided into homogenous tables, each having a single schema (record template), as required by the relational database model.

For example, a business organization may have some substantial structuring. Nevertheless, an address book might regard every company entity (e.g. company, division, department, unit, individual, etc.) as a contact, customer, client, or the like. Such a universal address book may need to accommodate all entities possessing an address and a phone number regardless of other attributes. Such a heterogeneous collection of arbitrarily structured records needs a query mechanism that can search and evaluate the records.

An arbitrarily structured record might include more than a single field having the same field identification or field name. A need exists to provide a meaningful query and a meaningful result for a search across repeating fields of the same name.

Also needed is an ability to provide logic to support multi-value results and to support unknown results. For example, with repeating fields (same name, identifier) within a record, query results may be ambiguous, at least by conventional methods of inquiry. For example, an answer to a query directed to a field name might have a true result for one field of the designated name, and a false result for another field in the same record having the same field name. Thus, a true result and a false result may exist for a query directed to a repeating field. Also, certain operations may result in undefined or otherwise unknown results. Some mechanism is needed to deal with such ambiguities without resulting in a failure of a query engine. Thus, a query structure and a query engine are needed to support multi-valued results and unknown results.

Another need is for a hybrid query. An arbitrarily structured record might contain textual contents in some fields while having non-text content in other fields. A search engine is needed to handle full text search operations and non-full text search operations combined in a single query.

The term heterogeneous database is often used to refer to databases provided by different database vendors (e.g. Oracle, Sybase, Informix, etc.). Heterogeneous, herein, by contrast, indicates that an individual database supports collections (or sets) of arbitrarily structured records within itself. That is, one record is arbitrarily structured with respect to another record within the same collection (or set) in a single database.

Some method of indexing and querying a database of such arbitrarily structured records is needed. Methods are also needed to optimize such searching to provide timely results. Accordingly, a query apparatus and method are needed for efficient construction and execution of queries directed to a heterogeneous database.

BRIEF SUMMARY AND OBJECTS OF THE INVENTION

In view of the foregoing, it is a primary object of the present invention to provide an apparatus and method effective to efficiently query a database comprised of arbitrarily structured records.

One of the consequences of fields that repeat within a record is that operators within a query may have multiple potential values to evaluate.

It is an object of the invention to provide a query apparatus and method in which operators are adapted to operate on sets of multiple values instead of just single values and return multiple values as their result, instead of just a single result.

It is an object of the invention to provide a method and apparatus to support aggregation and selection operators that act on sets of multiple values to yield single values. Such operators may be designed to operate on multiple values that occur in the course of evaluating a single record, NOT multiple records. Thus, the effect is fundamentally different from prior art, because these operators in prior art act on multiple values taken from multiple records and "distill" the records into a single record.

It is an object of the invention to provide a query apparatus supporting the universal quantifier operator ("for all") with respect to multiple values.

It is an object of the invention to provide a query apparatus supporting the existential quantifier operator ("for at least one") with respect to multiple values.

It is an object of the invention to provide a query apparatus and method to support an existence operator that may determine whether or not a field referenced within the query exists within a record Since records in a heterogeneous database may be arbitrarily structured, any given record in the database might not contain every field referenced in a query. Accordingly, it may be necessary for a user to determine in certain operations whether or not a field exists within a record being tested.

It is an object of the invention to provide a query apparatus and method in which operators are adapted to operate on an UNKNOWN value and return an UNKNOWN value as their result. UNKNOWN values typically arise when a field referenced in a query is missing from the current record being evaluated, but may also arise due to other anomalies that may occur in the course of evaluating a query—such as division by zero, modulo by zero, etc.

It is an object of the invention to provide a method and apparatus that can evaluate in an "integrated" way a query of arbitrary complexity that contains multiple separate full-text search expressions (simple or complex) intermixed anywhere in the query with other non-full-text search expressions.

It is an object of the invention to provide a method and apparatus to create and maintain compound alternate indexes on database records, wherein the contents of a key's components may be derived from alternate fields in a record.

It is an object of the invention to provide a method and apparatus supporting optimization of a disjunctive query using compound alternate indexes and/or non-compound alternate indexes.

It is an object of the invention to provide a method and apparatus to create and maintain filtered indexes on database records, wherein filtering criteria may be used to evaluate a record (its field contents and/or context) to determine whether or not a record is a candidate for indexing.

In accordance with the foregoing objects of the invention an apparatus and method in accordance with the invention may be adapted to query a database constructed of arbitrarily structured records.

In an apparatus and method in accordance with the invention, a processor in a computer, in or out of a network, may execute a query engine. The query engine may contain a query builder to allow a program to declare a query, allocate memory to hold information needed to process the query, and otherwise provide a method for searching and evaluating arbitrarily structured records in accordance with some criteria. The processor may also execute a query optimizer within a query engine. The query optimizer may validate syntax of queries, identify, coalesce, and coordinate full-text searches within the query, build a query plan that minimizes disk I/O operations, and the like.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Description of Operations

Figure 1:
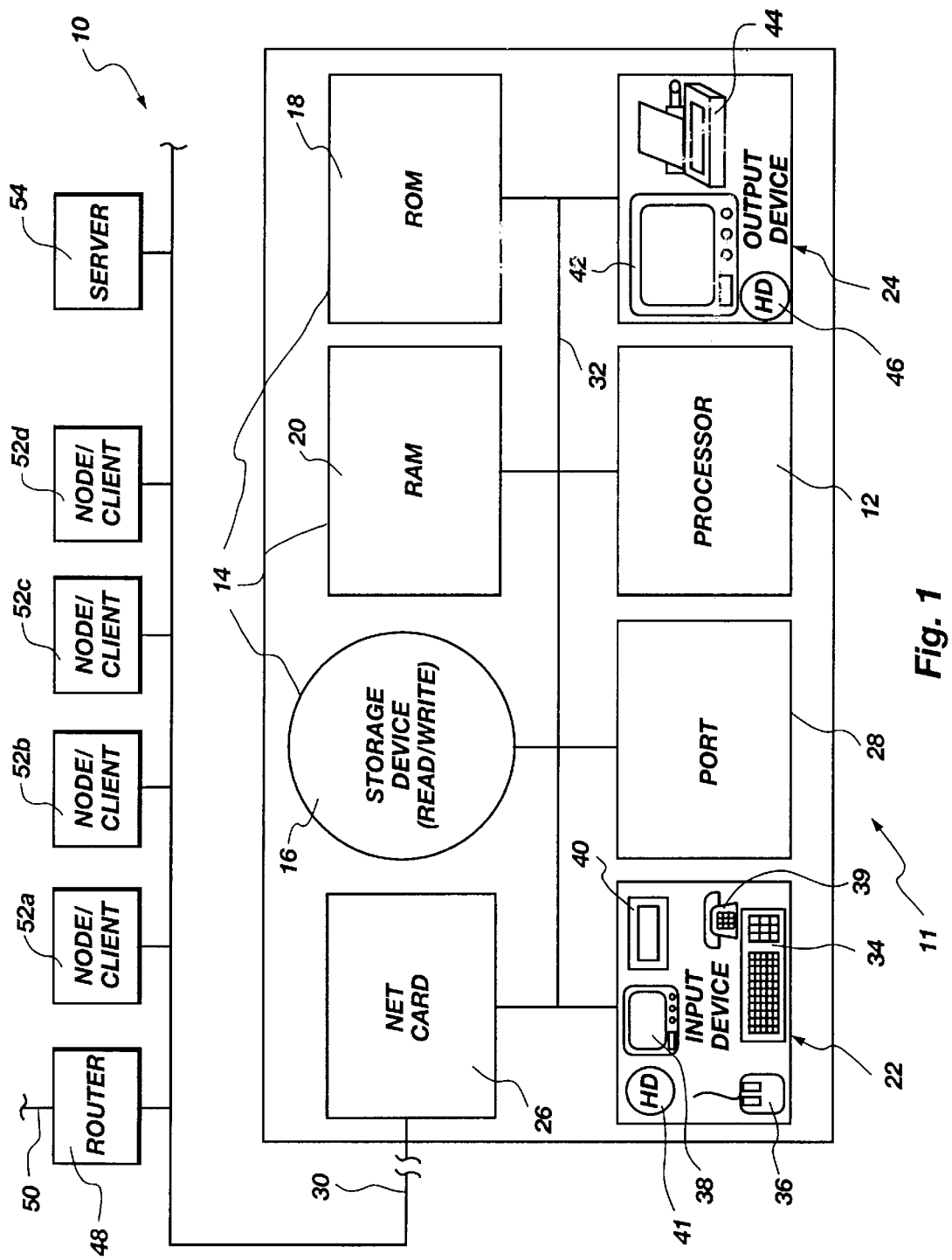
FIG. 1 is a schematic representation of an apparatus in accordance with the invention for hosting a heterogeneous database and a query engine adaptable to search the database.

Arbitrarily structured records have many useful and unique properties making conventional query technology inappropriate. The conventional limitations and new solutions should be put into perspective. For example, despite the fact that one may use "record typing" to classify records with common attributes, the primary usefulness of records in a database lies in the fact that they are distinguishable from one another. Typically, this distinction arises from the fact that any two real world objects of the same type, although having the same set of common attributes, will still have different "content" (or values) in one or more of those attributes. However, attribute values need not be the only means of distinguishing between objects of the same type. Another method for distinguishing is to allow the existence or non-existence of attributes as well as their relationship to other attributes to be additional distinguishing factors between objects that are otherwise of the same type. Objects that exhibit these kinds of differences between one another have traditionally been considered to be of different types (or classes). Forcing a new record type to be defined to handle all such unique cases will sometimes result in an awkward modeling of real world objects.

In contrast to records whose attributes are determined solely according to a record type definition, an arbitrarily structured record is one whose attributes might not be completely (or not at all) predetermined by a record type definition. In a schema structured record, the creator of a record cannot add new attributes to the record or otherwise alter its makeup. The makeup of the record is predetermined by a record type definition. The creator of the record is limited to assigning content (or values) to the defined attributes. No such constraints need exist for arbitrarily structured records. The creator of an arbitrarily structured record is allowed to determine the makeup of the record.

One of the primary features a creator has in constructing an arbitrarily structured record is the ability to determine a field's context within the record. A field's context refers to the field's position in the record with respect to other fields in the record. In an arbitrarily structured record, a field may be placed immediately subordinate to another field. In such a relationship, the subordinate field is referred to as the child field. The field it is subordinate to is referred to as the parent field. A field may have only one parent field. Multiple fields may have the same parent field, in which case they may be referred to as sibling fields. Any field may simultaneously be a parent field, a child field, and a sibling field within a given record structure. By creating parent/child relationships, one may build a hierarchical record structure. Other potentially interesting relationships may exist between fields besides parent, child, and sibling. Continuing the ancestral model, these may include uncle/aunt, nephew/niece, grandparent, first child, last child, nth child, first sibling, last sibling, nth sibling, and the like. The field at the top level (first ancestor) of an arbitrarily structured record may sometimes be referred to as the record's root field. The field identifier for this field may also be considered to be the record's "type" because it may supply an overall context for all other fields in the record that descend from it.

Another important feature of arbitrarily structured records may be the ability to create multiple occurrences of a field at any given level of a record. Because of this feature, an ability to control the order of multiple field occurrences at any level may become a matter of substantial importance.

One interesting facet of a field's context is the field's direct ancestry (parent, grandparent, etc.). A list of fields from some ancestor field (parent, grandparent, great grandparent, etc.) to some descendant field (child, grandchild, great grandchild, etc.) may be referred to as a field path. A full field path starts at the root field of a record.

One convention for showing a field path is to show each field name in a path starting at some ancestor field and moving down to the descendant field, separating each field name with a delimiter, such as a period. For example, the field path BIRTH.ADDRESS.CITY may specify a field path where the BIRTH field is a parent to the ADDRESS field, and the ADDRESS field is a parent to the CITY field.

A field path may clarify the intended meaning of a field at the end of the path by placing it in context. The longer a field path, the more precisely it may clarify the meaning of the field at the end of the field path. For examples a field CITY all by itself may have many potential meanings When placed as a child to a field ADDRESS, it becomes clear that the CITY field is part of some address. Placing ADDRESS subordinate to a field BIRTH may give even more context and indicates that the city is part of some birth address. In this manner, besides a meaning that is normally conveyed in field content, the creator of an arbitrarily structured record may impart additional meaning by manipulating record structure.

Thus, in a database that allows arbitrarily structured records, it is conceivable for every record in the database to have a slightly, or even radically, different makeup. What is important is that context should provide four pieces of information: parent field, first child field, previous sibling field, and next sibling field. So long as this information is known for any field, context is sufficient to define an entire hierarchy of fields within a record. Implementation may be done in several ways. For example, in one embodiment, a field may store four pointers, identifying parent, first child, previous sibling, and next sibling with respect to the field in question. In another embodiment, each field need only store a level number indicating level of nesting or generational position, along with two pointers. One pointer may indicate the previous field, and the other pointer may indicate the next field. Thus, the entire hierarchy of fields in the record may be determined.

Large Text Fields

Traditionally, documents have been stored in files that are managed separately from the database system. Because of the magnitude and variability of their size, documents were not considered appropriate content for databases. However, database technology has progressed. Certain strategic advantages may arise when documents are made an integral part of the database. This may be done by incorporating a document as a special type of field within a database record. This type of field may be referred to as a Binary Large Object (BLOB). The content of such a field may be the content of a document itself. BLOB fields may be present in both schema structured and arbitrarily structured types of records. The presence of these disparate types of field contents need a new paradigm for querying.

Querying

Any application that relies on a database system to store data needs a mechanism for retrieving that data. The functionality that a database system provides for finding and retrieving data constitutes the database system's query capabilities. These query capabilities may be embodied in an executable characterized as a query engine.

Definition of a Query

A query may be thought of as a request for information from a database. Specifically, it may request a set of records that satisfy certain conditions, or criteria, sometimes called selection criteria. In a logical sense, a selection criterion is a predicate that evaluates to a {TRUE} or {FALSE} result for the contents of any given record in a queried database. Typically, selection criteria compare the contents of specific fields within a record to constants, the contents of other fields inside the same record, or arithmetic expressions involving the contents of other fields in the same record.

For example, {LAST_NAME="Davis"} is a predicate comparing the contents of a LAST_NAME field with the string constant "Davis." Similarly, {LAST_NAME= ALIAS_NAME} is a predicate comparing the contents of a LAST_NAME field to the contents of an ALIAS_NAME field. Another predicate may be {SALARY<MINIMUM_ RANGE+1000 * YEARS_IN_GRADE}. This predicate compares the contents of the SALARY field to an arithmetic expression involving the contents of the MINIMUM_ RANGE field and the contents of the YEARS_IN_GRADE field.

Selection criteria may be simple or complex. Complex selection criteria may be formed by boolean operations like ANDing or ORing multiple comparison expressions. For example, {(LAST_NAME="Davis" OR ALIAS_NAME= "Davis") AND FIRST_NAME ="Jim"} refers to alternatives. So long as "Jim" matches the content of a FIRST_ NAME field, "Davis" will satisfy the query if it appears in either the LAST_NAME or ALIAS_NAME field.

Query Syntax

Database systems typically have well-defined rules and grammar for expressing selection criteria, known as query syntax. Generally speaking, query syntaxes follow standard industry practices for constructing boolean expressions. Twomain components occur in query syntaxes, operators and operands. Operators perform some operation on one or more operands, resulting in a value or result.

Operators

Operators may include logical (boolean) operators (AND, OR, NOT). They also may include comparison operators for equality, less than, less than or equal to, greater than or equal to, greater than, and inequality (=, <, <=, >=, >, !=). Arithmetic operators may include addition, subtraction, division, multiplication, modulo operations, and the like (+, −, /, *, MOD, etc.). Binary operators require two operands, whereas unary operators require only one operand.

Operands

Operands may be atomic or complex. An atomic operand may be one of the following: 1) the contents of a field within a record, 2) a constant (e.g., string, integer, etc.), or 3) a list of distinct values. A complex operand may be merely another expression. Whenever an expression is supplied as an operand to an operator, the expression may be evaluated and the result of the expression used as a value in the corresponding operation.

The SALARY example above illustrates this principle. The "less than" operator (<) is a binary operator requiring two operands. In the expression in this example, the first operand for the less than operator is the content of the SALARY field. The second operand is an arithmetic expression involving the contents of the MINIMUM_RANGE field and the contents of the YEARS_IN_GRADE field. In order to return a result for the less than operator, the arithmetic expression will be evaluated first. The result will be used as the right hand operand in the "less than" comparison. In this example, the arithmetic expression is further decomposable into other simpler arithmetic expressions. In general, a complex operand may be recursively decomposed to a level at which the operands are all atomic operands. Results from lower level operators are used as operands by each succeedingly higher level operator.

An atomic operand may be a list of distinct values Certain reasons and uses for this arrangement include the use of repeating fields. As a matter of convention, hereafter, an operand's value (or list of values) will be denoted using braces ({}) to enclose the value (or list of values). If more than one value exists, each value will be separated (delimited) by a comma. In the example {LAST_NAME= "Davis"}, LAST_NAME is the left operand for the equal (=) operator. The left operand actually represents the contents of the LAST_NAME field in a current record being evaluated. If the contents of the LAST_NAME field in the current record were "Jones, " the operand's value may be denoted as {"Jones"}. If LAST_NAME were a repeating field within the current record and occurrences had the value "Jones" and the value "Peterson," the operand's value may be denoted as {"Jones", "Peterson"}. The right operand, which is the string constant "Davis," may be denoted as {"Davis"}.

Query Optimization

Retrieving a result set for a particular query may be quite time-consuming, as it involves disk input and output (I/O) operations. Query optimization may include a process by which those disk I/O operations are reduced toward an absolute minimum. Optimization may be regarded as beneficial or fundamental for a query mechanism.

One major factor in query optimization is the use of indices. In general, an index may be thought of as a set of keys which may be arranged in a way that significantly speeds up the task of finding any particular key within the index. In a database, index keys are typically constructed by extracting the contents of one or more fields from records in the database. A key constructed from more than one field's contents is called a compound key. In a compound key, multiple fields' contents may be concatenated together to form a key. Each concatenated piece of the key is called an element of the compound key. An index definition specifies which fields' contents are to be extracted from records and the order in which these field contents are to be concatenated to construct a key in the index. Each key in an index typically references the record or records from which they were constructed. Note that a key may reference more than one record; it is possible for multiple records in the database to have field contents that would construct an identical key in the index.

Full Text Indices

A full text index may be created to assist in the evaluation of full text searches. In contrast to traditional database indices, which create keys based on the entire contents of fields in database records, a full text index typically creates keys from the "words" in a field (or fields). Each key in the index may have an associated list of references that cites the records/fields in the database that contain the key word. This is very similar to an index that one might find at the end of a book. In such an index, the words are arranged in a way that makes them easy to find (for example, alphabetically). Once a word is found, it cites the pages or paragraphs or sections of the book where the word is found. In order to cite a referenced record, a full text index must have some uniform method for identifying records. This will be referred to hereafter as the record identifier, or record id. One example of a record identifier may be a unique number assigned to each record by the database system as the records are created.

Alternate Compound Key Indices

Compound keys may be constructed by concatenating the contents of multiple fields in a record. However, each element of a compound key has traditionally been constructed from one and only one field. In a method and apparatus in accordance with the invention, a new kind of index may be generated and maintained by the database system, called an alternate compound key index. In such an index, an individual element of a compound key may be constructed from the contents of any number of alternative fields in a record.

Thus, for any element within a compound key, the existence of alternate fields in the index definition may multiply the number of ways that a key may be formed within that index. All these alternate compound keys may be in the index.

For example, a compound index definition having two alternate fields for the first element, three for the second element, two for the third element, and one each for a fourth and fifth element, may present 2*3*2*1*1 (or 12) alternative ways to form a key. Within an index definition all combinations may be exhaustively enumerated. However, a syntax may be provided to limit combinations of alternate elements to some desired subset having meaning to the index creator.

Query Optimization With Alternate Key Indices

In selection criteria, it may be common to have sub-predicates which have been ORed together. This kind of selection criteria is sometimes referred to as disjunct or disjunctive criteria. In one special case of a disjunct criterion the sub-predicates that are ORed together involve multiple different fields. Optimization of such disjunct criteria might sometimes be done using multiple different indices. The results obtained by searching multiple indices must typically be post-processed to eliminate duplicate references to the same record that may have been obtained from the different indices.

In a method and apparatus in accordance with the invention, alternate key indices (including alternate key indices that contain only a single element) may be used to optimize disjunct criteria involving multiple different fields. Use of multiple indices may not be required if an appropriate alternate key index is available. This is because a query engine can recognize that although multiple and different fields are being used in sub-predicates, the fields may be indexed in the same element position within a single alternate key index. Thus, generating search keys for the alternate key index is sufficient to perform the search. In addition, the post processing step of eliminating duplicate references may no longer be necessary because they have been eliminated by virtue of the process of being added as index keys to the index.

Querying Arbitrarily Structured Records

Arbitrarily structured records pose certain interesting problems for querying. For example, arbitrarily structured records are, by definition, unpredictable in their makeup. Thus, the methods for evaluating selection criteria may require capabilities not found in traditional query engines Missing Fields A missing field is one that is referenced in certain selection criteria, but is not present in a record currently being evaluated by the query engine. This is not an issue in prior art systems. Existing query engines do not allow the expression of selection criteria that reference fields not defined in record type definitions. In contrast, in a database that allows arbitrarily structured records, a query engine may not be able to predetermine whether a given field will be present in every record that will be evaluated. A query engine needs to include mechanisms to deal with the possibility of missing fields.

Field Existence Predicate

In a method and apparatus in accordance with the invention, the query syntax for formulating selection criteria may include a mechanism for testing for the presence or nonpresence of a field in a record. This may be done by supplying a field name as an operand to a logical operator (AND, OR, or NOT). Normally, when a query engine sees a field name in selection criteria, it retrieves the field's content from the current record and uses that content as the value in the expression. However, the only valid operand values for logical operators are {TRUE} or {FALSE} values. Thus, when the query engine sees that a field name is an operand to a logical operator, instead of retrieving the contents of the field from the record, it may test for the existence of the field in the record. One may have a selection criterion that contains only a field name. Since evaluation of selection criteria always results in a {TRUE} or {FALSE} value, this special case may be evaluated in the same way it would be if the field were used in conjunction with a logical operator. For example, the selection criterion ALIAS_NAME may simply test for the existence of the ALIAS_NAME field in a record The selection criterion {ALIAS_NAME AND LAST_NAME="Davis"} may test for specific content in the LAST_NAME field, and also test for the presence of the ALIAS_NAME field.

A field existence predicate may yield a {TRUE} value if the field is present in the record. Otherwise, the resultant value may be a {FALSE} value.

Unknown Value Propagation

A field referenced in a selection criterion may not be present in a record currently being evaluated by a query engine. Such a field has no definable value that can be used to evaluate the selection criteria, except when it is used in a field existence predicate (in which case it yields precisely one value: {FALSE}). In a method and apparatus in accordance with the invention, all missing fields not involved in field existence predicates may cause the query engine to use a value of {UNKNOWN} for the field's content. A specific set of rules may govern the evaluation of expressions involving {UNKNOWN} values. These rules may be based on the specific operator being evaluated.

For example, an expression involving an arithmetic operator and at least one operand with an {UNKNOWN} value may result in an {UNKNOWN} value. Similarly, a predicate involving a comparison operator and at least one operand with an {UNKNOWN} value may also result in an {UNKNOWN} value.

However, the result of a predicate involving a logical operator and an {UNKNOWN} value in either or both operands may be determined differently. If the operator is an AND operator, and one operand has an {UNKNOWN} value while the other is {FALSE}, the result of the predicate may be treated as {FALSE}. If the operator is an OR operator, and one operand has an {UNKNOWN} value while the other is {TRUE}, the result may be treated as {TRUE}. All other combinations involving {UNKNOWN} values may result in {UNKNOWN} values.

During evaluation of selection criteria against a particular record, an {UNKNOWN} value may be propagated upward through a query tree until it reaches the highest root level. At that point, the {UNKNOWN} value represents the result of the selection criteria evaluation for the record currently being evaluated. However, in order for a query engine to either accept or reject a record, a result obtained from evaluating the selection criteria needs to be {TRUE} or {FALSE}.

An {UNKNOWN} result does not indicate whether a query engine should accept or reject the record being evaluated. In the event that an evaluation of certain selection criteria results in an {UNKNOWN} value, it becomes necessary to translate the {UNKNOWN} value into a {TRUE} or {FALSE} value. In a method and apparatus in accordance with the invention, a query engine may allow the framer of a query to specify which value ({TRUE} or {FALSE}) an {UNKNOWN} value is to be translated into whenever returned as the result of the evaluation of the selection criteria.

Repeating Fields

A repeating field may be referenced in a selection criterion, and occurs more than once in a record currently being evaluated by a query engine. Except when used in a field existence predicate, a repeating field may potentially yield multiple distinct values (in a field existence predicate, a repeating field will yield precisely one value: {TRUE}). Each value represents a distinct evaluation path. For a database that allows arbitrarily structured records, a query engine needs to include mechanisms to deal with the possibility of repeating fields in a record.

Multi-Value Evaluation and Propagation

In a method and apparatus in accordance with the invention, a query engine may extract a list of distinct values from the record currently being evaluated for each field referenced in the selection criteria. In the case of a non-repeating field, this list may include a single value. In the case of a repeating field, this list may include multiple values. Although a field may repeat, there may still only be one distinct value in each occurrence of the field.

When evaluating an operator, all of the combinations of values contained in its operands are evaluated to produce a result. The result of such an operation is a list containing each distinct value that is produced as a result of evaluating the various combinations of values from the operator's operands. More specifically, a binary operator that has n values in one operand and m values in the other operand may yield anywhere from 1 to n*m distinct values. A unary operator that has n distinct values in its operand may yield anywhere from 1 to n distinct values. In the case of comparison operators (<, <=, etc.) and logical operators (AND, OR, NOT) only three distinct values are even possible: {TRUE}, {FALSE}, or {UNKNOWN}. Hence, a comparison operator or logical operator can only return up to three distinct values, regardless of the number of values in either of its operands.

When evaluating a comparison operator or a logical operator, a query engine may stop evaluating combinations of values in operands when the evaluation process has produced all three possible result values. At this point, it is useless to process any more combinations of operand values, as no more distinct results can be produced.

In a method and apparatus in accordance with the invention, special conversion operators may be provided to allow the framer of a query (a user, or a device) to convert a multi-value result into a single value.

Quantifying Operators

In one presently preferred embodiment, quantifying operators may be provided to allow the framer of a query to convert a multi-value such as {TRUE, FALSE}, which can result from comparison operators and logical operators, into a single value, i.e., either {TRUE} or {FALSE}. These operators may be referred to as a universal quantifier ("for every" operand) and an existential quantifier ("for some" operand). Although a primary purpose of these operators is to convert a multi-value operand such as {TRUE, FALSE} into a single value, these operators also work for the single values {TRUE}, {FALSE}, or {UNKNOWN}.

Universal Quantifier

Conceptually, an effect of the universal quantifier may be to ensure that a comparison operator or logical operator is {TRUE} for every combination of operand values Typically, this may be used on a comparison operator to ensure that the comparison is {TRUE} for all occurrences of a field that is being compared to some other value. For example, for a selection criterion {GPA>3.5}, one may evaluate a STUDENT record that has a GPA recorded (field and value) for every semester of attendance. Thus, GPA may be a repeating field in the STUDENT record. If some semesters have GPAs less than 3.5 and some are greater than 3.5, this selection criterion will return a {TRUE, FALSE} value. If all semester's GPAs are greater than 3.5, this selection criterion will return a {TRUE} value. If all semester's GPAs are less than or equal to 3.5, this selection criterion will return a {FALSE} value.

By changing the criterion to {EVERY( GPA>3.5)}, the selection criterion will now only return a {TRUE} or {FALSE} value. No {TRUE, FALSE} value can result. If all of the semesters' GPAs are greater than 3.5, it will return a {TRUE} value, otherwise, a {FALSE} value.

Existential Quantifier

Conceptually, the existential quantifier may ensure that a comparison operator or logical operator results in a value of {TRUE} if at least one combination of operand values results in a {TRUE}. Typically, this may be used with a comparison operator (as operand) to ensure that the result of such comparison is {TRUE} for at least one occurrence of a field that is being compared to some other value. Using the example of a GPA field, above, change the criterion to {SOME(GPA>3.5)}. The selection criterion will now result in a return of {TRUE} if at least one of the semesters' GPAs is greater than 3.5. This occurs regardless of whether other GPAs are less than or equal to 3.5.

Aggregation Operators

In one currently preferred embodiment of a method and apparatus in accordance with the invention, aggregation operators may be provided in a query and associated query engine. Aggregation operators allow a framer of a query to convert a multi-value operand into a single value. Accordingly, the invention is unique in supporting conversion of a multi-value operand into a single value.

The universal and existential quantifier operators may be thought of as a special kind of aggregation operator. In general, aggregation operators may be designed to work on a single type of value. For example, the quantifier operators may be used or defined exclusively for boolean data as noted above.

The SUM, AVERAGE, MINIMUM, and MAXIMUM operators may be defined to operate exclusively on numeric values Thus, using such an operator on the result of a comparison operator or a logical operator, or anything that does not return a numeric value, may be an error. Likewise, using a quantifier operator on non-boolean values may be an error. However, such limitations in the definition of certain aggregation operators does not imply that aggregation operators cannot be defined to operate on more than one type of value.

Although a primary purpose of aggregation operators may be to convert a multi-value operand into a single value, these operators may also operate on operands representing or having single values. A single value may be thought of as a special case of a multiple value.

Prior art query engines do not provide or support aggregation operators operating on multiple fields in a single record. Moreover, those engines define aggregation only in a limited sense, for limited operators, for aggregating the values of a field from multiple records. The instant invention supports aggregating the values from a repeating field within a single record.

In a method and apparatus in accordance with the invention, a SUM aggregator may operate on an operand that includes a list of one or more numeric values, such as {1,5,10,12}. SUM returns a single value that is the sum of the numeric values in the list. In this example the returned value is {28}.

An AVERAGE aggregator may accept as an operand a list of one or more numeric values, such as {1,5,10,12}. The operator returns a single value, the average of the numeric values in the list. In this example the returned value is {7}.

A MINIMUM aggregator may accept as an operand a list of one or more numeric values, such as {1,5,10,12}. The operator returns a single value that is the lowest of the numeric values in the list. In this example the returned value is {1}.

A MAXIMUM aggregator may accept as an operand a list of one or more numeric values, such as {1,5,10,12}. This operator returns a single value that is the highest of the numeric values in the list. In this example the returned value is {12}.

Specifier Operators

Specifier operators are provided to allow the framer of a query to specify a particular occurrence of a value within a multi-value operand that is to be used to evaluate the operator. Accordingly, unique to the invention is an operator that will specify a particular occurrence of a value within a multi-value operand. Specifier operators may include FIRST, LAST, NTH, and the like.

In the example using GPA above, consider a criterion FIRST(GPA)>3.5. The selection criterion will now only test the first occurrence of the GPA field occurring in the STUDENT record. If that particular GPA is greater than 3.5, the selection criterion returns {TRUE}, otherwise {FALSE}. This result occurs regardless of the values that may be in other occurrences of the GPA field.

Specifying Field Context

As described, an arbitrarily structured record may be hierarchical in nature. Any field may appear at any level in such a hierarchy. Occurrences at many different levels may represent a different meaning for each occurrence. This creates a problem solved by a query engine in accordance with the invention. A field may be used in different contexts in arbitrarily structured records. Thus, the meaning of the field in one context may be different from the meaning of the field when used in a different context. It may be appropriate for a field's contents extracted from one context to be used in evaluating certain selection criteria yet not be appropriate when the field content is extracted from a different context.

To differentiate, a query engine needs to be capable of evaluating a field's context as well as its content. In a method and apparatus in accordance with the invention, the framer of a query may specify a field's context when referencing the field in selection criteria. Partial, full, or no context may be specified.

The query engine may extract contents of a field referenced in a selection criterion. Extraction may be limited to occur only if the field is found in the specified context. The degree or level at which the field context is specified may be selected by a framer of a query. The query engine may then recognize the context and level of context in order to restrict a search to more (or less) specific meanings of the field.

For example, the field CITY may be used in various arbitrarily structured records within the same database to represent birth places, current residences, business addresses, and the like. A selection criterion {CITY="Salt Lake"} may be part of a somewhat broad and unfocused query, absent context. When the creator of these different records identifies the CITY field as subordinate to other fields, that context gives additional meaning. For example, BIRTH, RESIDENCE, BUSINESS, etc. may focus the query. To focus only on birth cities, the selection criterion may be changed to {BIRTH.CITY="Salt Lake"}.

Heterogeneous Result Sets

In a database that contains arbitrarily structured records, every record may have a slightly (or radically) different makeup. A collection of such records is heterogeneous in terms of record structure, and may be heterogeneous in terms of meaning. Many different "kinds" of objects may simply be stored together. In a method and apparatus in accordance with the invention, the query engine may return records in response to a query that are, in fact, heterogeneous in terms of structure and meaning. Since there is no implicit criteria that restricts the query to examine only records which conform to a particular predefined structure, any record which satisfies the selection criteria will be returned. Of course, the framer of a query may choose to make explicit in the selection criteria a test that will reject all but a certain "kind" of record Relational and Object-Oriented Databases In relational databases, the result of a query is a return of a homogeneous set of records (in terms of record structure). Relational query engines have mechanisms for specifying the scope of a query. The scope of a query is the collection of candidate records that are to be searched to satisfy the query selection criteria. Typically, the scope is focused on a single "type" of record or object. In Structured Query Language (SQL), the scope of a search is set using a FROM clause. The FROM clause specifies which tables are to be searched. Typically, a single table is specified, which is essentially a collection of homogeneously structured records However, when multiple tables are specified in the FROM clause, this is interpreted as a request to join records from the multiple tables into composite records. The composite record is made up of fields selected from the tables involved in the join operation (the fields are specified in a SELECT clause). Thus, although a search is examining records from multiple tables, the resulting records are always uniformly structured composite records.

In object oriented databases, a query focuses on the attributes of a particular class of object. Because other classes of objects can inherit from that class or contain a member of that class, the result of a query may return multiple types of objects. Thus, the result of a query in an object oriented database may be heterogeneous, depending on how the class is used in defining other classes (via inheritance or embedding) In any case, the set of records that can potentially be returned is confined to those that inherit from this class or embed the class as a member.

In a method and apparatus in accordance with the invention, a query engine allows a "scope" to be set to a container of records, which may be a collection of many "kinds" of records that are arbitrarily structured with respect to each other. This is an important difference from any kind of prior art. The scope of records that can be returned is not restricted by record type definitions, table definitions, or object class definitions Joining Heterogeneous Sets In relational databases, a join operation allows two or more "relations" to be joined together to form a new "relation". The new "relation" that is the result of a join operation is a set of records that are composite records comprised of fields taken from the relations being joined together.

A join operation is, in reality, a cross product operation. In relational database systems, it can only be performed on relations, which, from one perspective, may be viewed as sets of homogeneously structured records. In a method and apparatus in accordance with the invention, the join operation can also be performed on sets that are heterogeneous collections of records.

Integration of Full Text Searching and Traditional Database Queries

The primary motivation for full text searching mechanisms is the need to find documents that contain words or combinations of words. In modern database technology, documents may now be embedded in their entirety as Binary Large Object (BLOB) fields in database records. Traditional database queries treat a field's content as a single unit on which to perform comparisons. This is inadequate for searching words or combinations of words in BLOB fields which contain documents. To accommodate this type of search, a new class of operators may be necessary. In particular, a contains operator becomes useful for expressing selection criteria involving full text search operations (see below). NOTE: For our purposes, a word may be understood to be a sub-string of characters in a field that is delimited from other sub-strings in the field using delimiter characters (typically spaces, tabs, carriage returns, punctuation marks, etc.).

In the prior art, mechanisms exist for performing full text searches, but these searches are typically expressed and evaluated independently from the more traditional database "field" searches. In a method and apparatus in accordance with the invention, full text search criteria and traditional database selection criteria may be expressed in a single unified selection criterion.

A query engine has the capability to examine a single unified (combined) selection criterion. The engine may partition the criterion into its full text search portions and traditional search portions, execute both searches, and correlate the results of both types of searches. The engine may then produce a single unified result set that satisfies all of the originally specified criteria. Furthermore, the query engine is enabled to perform search optimizations that are not otherwise possible when the two kinds of search criteria are separate.

Hybrid Selection Criteria

In a method and apparatus in accordance with the invention, a framer of a query may construct a selection criterion of traditional operators (comparison, logical, arithmetic, etc.) and operators pertaining to full text searching. Such a selection criteria is called a hybrid selection criterion. Full text searching operators include, but are not limited to, a CONTAINS operator. For example, the following selection criteria: {AUTHOR="James Fenimore Cooper" AND (SUMMARY contains "Pathfinder" OR DOCUMENT contains "Pathfinder")} may be used to request a search for all books whose author is "James Fenimore Cooper" where the book summary or the book content itself contains the word "Pathfinder." This is an example of embedding a full text search predicate in a selection criterion. The sub-predicate: {AUTHOR="James Fenimore Cooper"} is a traditional type of selection criterion. The equals (=) operator is understood by the query engine to mean "compare the entire contents of the field." The sub-predicate: {SUMMARY contains "Pathfinder" OR DOCUMENT contains "Pathfinder"} on the other hand, is a full-text-search type of criterion. The contains operator is understood by the query engine to mean "see if the specified word is found somewhere in the field."

Note that it really does not matter whether the SUMMARY and DOCUMENT fields are BLOB fields or merely lengthy text fields. This may be transparent to the framer of the query. In either case, the meaning of the contains operator may be the same.

Hybrid Selection Criteria Partitioning

In a method and apparatus in accordance with the invention, the query engine is able to parse a hybrid selection criterion. The engine may distinguish between sub-predicates that should be handled using full text search semantics and sub-predicates that should be handled using traditional database search semantics. As the selection criterion is parsed, each sub-predicate may be classified as a full text or traditional sub-predicate. Using the associative, commutative and other mathematical properties of logical operators (AND, OR, NOT), sub-predicates may be rearranged so that sub-predicates of the same type (i.e., full text, or traditional field-type) will be grouped together as much as possible without changing the intended search semantic of the overall selection criterion.

Hybrid Selection Criteria Evaluation

In one embodiment of a method and apparatus in accordance with the invention, the query engine may evaluate a hybrid selection criterion as follows:

1. Narrow the scope of candidate records using optimization techniques on the traditional database sub-predicates. NOTE: Depending on the selection criterion, this optimization may significantly reduce the set of candidate records that need to be evaluated.

2. When a candidate record is evaluated against the selection criterion, the query engine may or may not be required to test each sub-predicate. The query engine may ignore a sub-predicate under the following circumstances: a) if the sub-predicate is ANDed with another sub-predicate whose result is {FALSE} for the record currently being evaluated, or b) if the sub-predicate is ORed with another sub-predicate whose result is {TRUE} for the record currently being evaluated. This technique may be referred to as partial evaluation.

3. In one embodiment of a method and apparatus in accordance with the invention, the first time a query engine is required to test a sub-predicate that has full text search semantics, the query engine may hand the subpredicate to a full text search engine. The full text search engine may search a full text index or indices and other information needed to perform the search.

The full text search engine may collect and return the entire list of records that satisfy the full text search criteria of the sub-predicate. This may be called a hit list. If the record ID of the record currently being evaluated is found in this hit list, the sub-predicate returns a {TRUE} value. Otherwise, it returns a {FALSE} value.

Subsequent tests of the predicate on subsequent candidate records need not search the full text index again. It may suffice to simply examine a hit list previously obtained. To do this, the query engine may save the hit list for use in evaluating each subsequent candidate record.

Any given selection criterion may contain more than one such hit list, depending on where full text search sub-predicates appear. Saving hit lists for full text search sub-predicates may often be more near optimal than scanning field content (or fields' contents) in a current record being evaluated to see if the field (or fields) contains the desired word (or words). It may also be more nearly optimal than searching a full text index for each candidate record.

4. In one embodiment of a method and apparatus in accordance with the invention, hit lists collected during the course of evaluating certain selection criteria may be ordered by record. This provides rapid examination of the hit list for a particular record.

The examination of a hit list may be improved even further if candidate records are evaluated in order. In general, if hit lists are ordered according to some key (it need not be a record ID), and the candidate records are evaluated in the same sort order, it is possible to reduce the portion of the hit list that needs to be examined for each successive candidate record, thus improving performance.

Description of Structures

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 14, is not intended to limit the scope of the invention, as claimed, but is merely representative.

The presently preferred embodiments of the invention will be best understood by reference to the drawings, wherein like parts are designated by like numerals throughout.

Those of ordinary skill in the art will, of course, appreciate that various modifications to the detailed schematic diagrams of FIGS. 1–14 may easily be made without departing from the essential characteristics of the invention, as described. Thus, the following description of the detailed schematic diagram of FIGS. 1–14 is intended only by way of example. It simply illustrates certain presently preferred embodiments of the invention as claimed herein.

Referring now to FIG. 1, an apparatus 10 may include a node 11 (client 11, computer 11) containing a processor 12 or CPU 12. The CPU 12 may be operably connected to a memory device 14. A memory device 14 may include one or more devices such as a hard drive or non-volatile storage device 16, a read-only memory 18 (ROM) and a random access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like. Similarly, a scanner 40 may be used to receive graphical inputs which may or may not be translated to other character formats. The hard drive 41 or other memory device 14 may be used as an input device whether resident within the node 11 or some other node 52 (e.g., 52a, 52b, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 52a, 52b, 52c, 52d) may have various communication capabilities.

In certain embodiments, a minimum of logical capability may be available in any node 52. Note that any of the individual nodes 52a–52d may be referred to, as may all together, as a node 52.

A network 30 may include one or more servers 54. Servers may be used to manage, store, communicate, transfer, access, update, and the like, any number of files for a network 30. Typically, a server 54 may be accessed by all nodes 11, 52 on a network 30. Nevertheless, other special functions, including communications, applications, and the like may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components 12–46 may need to communicate data with one another. A communication link may exist, in general, between any pair of devices.

Figure 2:
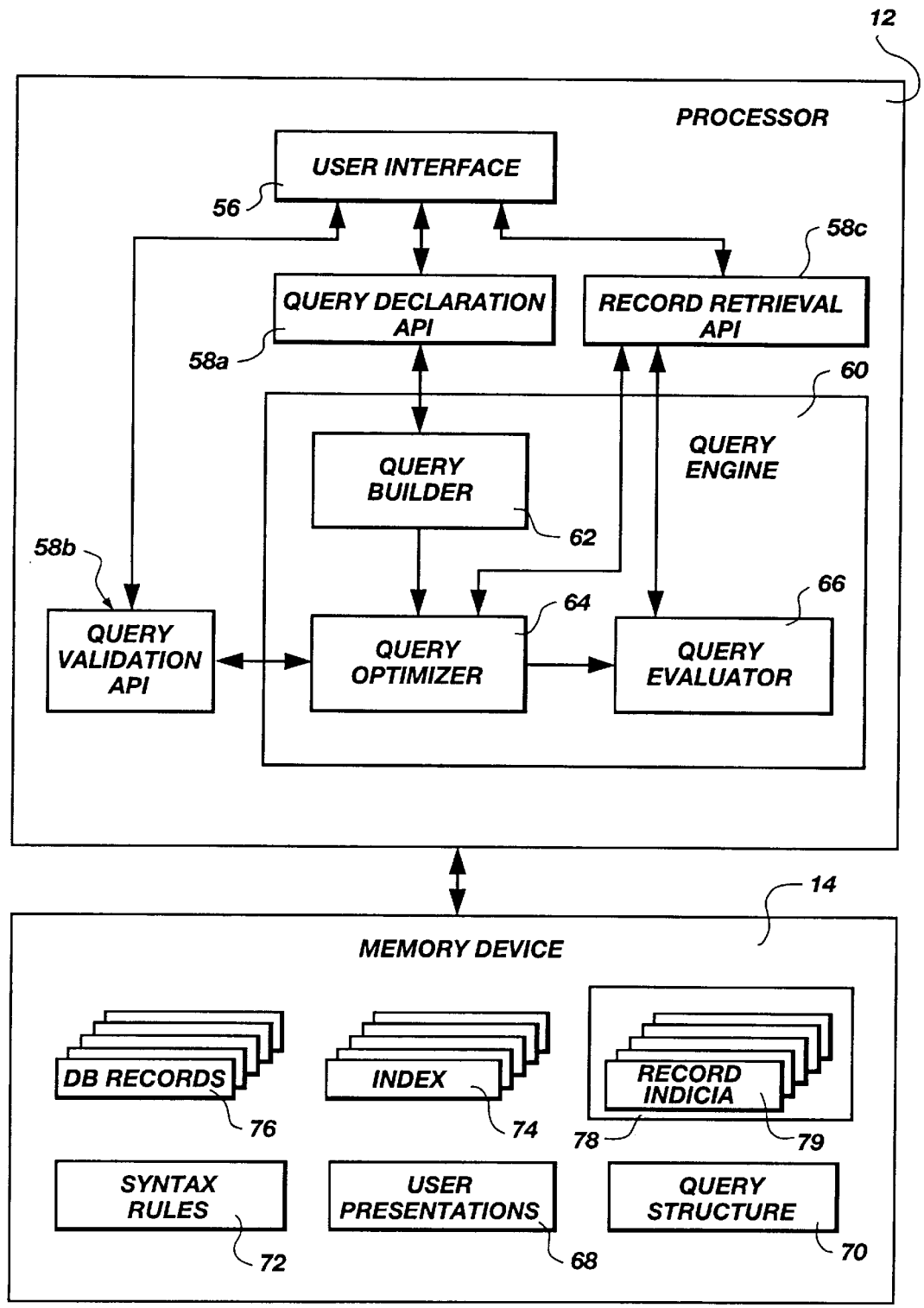
FIG. 2 is a schematic block diagram of a processor and memory device of FIG. 1 hosting a query engine and data structures, associated therewith.

Referring now to FIG. 2, the processor 12 may host a user interface 56. The user interface may contain executables effective to receive from an input device 22 within a node 11 or another node 52 on a network 30, a query. A set of application programming interfaces (API) 58 (e.g. 58a, 58b, 58c) may be provided. The user interface 56 may operate through a query declaration API 58a. The query declaration API 58a may provide an interface to a query builder 62 in the query engine 60. The query builder may include a module executable by the processor 12 to build a query in accordance with a set of selection criteria input from an input device 22. The input device 22 may include remote devices communicating through the port 28 or over the network 30.

A query validation API 58b may provide instructions to the query engine 60 suitable for validating syntax and other features of a query provided by a user. A record retrieval API 58c may be provided in association with the query engine 60 to retrieve indicia of records satisfying a query.

A query optimizer 64 may be provided for minimizing the input and output operations required by the processor 12 with respect to other memory devices 14 in the node 11 hosting the query engine 60, or in another node 52 hosting a query engine 60. That is, a database may be stored in the node 11 or another node 52.

Referring again to FIG. 2, user presentations 68 may be stored in the memory device 14. User presentations 68 may include templates, graphics, dialogues, and the like for use by a user interface 56. Thus, the user presentations 68 may include drivers for input devices 22 and output devices 24 to communicate with a user in preparing information appropriate to query construction.

The query builder 62 may create a query structure 70. The query structure 70 may consist of storage in the memory device 14 for holding representations of selection criteria declared by the user through the query declaration API 58a.

The query structure 70 may be represented as a buffer, a binary tree, or some other format. The query structure 70 may be altered by the query optimization module 64 in a query engine 60, and utilized by the query evaluation module 66 in a query engine 60 to evaluate records 76 against the selection criteria contained in a query structure 70.

Syntax rules 72 may be stored in a memory device 14 for use by a query optimizer 64. A query optimizer 64 may use syntax rules 72 in order to evaluate syntax of a query received from a query builder 62. A query validation API 58*b* may provide access to this syntax evaluation capability.

A record retrieval API 58*c* may provide access to a query evaluator 66. An output of a query evaluator 66 is an indicia of a database record 76.

A memory device 14 may contain database records 76. Of particular interest is any database of a heterogeneous type. That is, database records 76 may be arbitrarily structured with respect to one another. The database records 76 may be stored within a memory device 14 in a node 11, or in some other node 52 or a remote computer on the network 30 or foreign network 50.

A database engine responsible for maintaining records 76 may create and maintain indices 74 in accordance with index definitions 102 (see FIG. 3) provided to the processor 12.

Results 78 from the query evaluator 66 may be stored in a memory device 14. Results 78 output by the query evaluator 66 may typically include indicia 79 referring to records 76.

Figure 3:
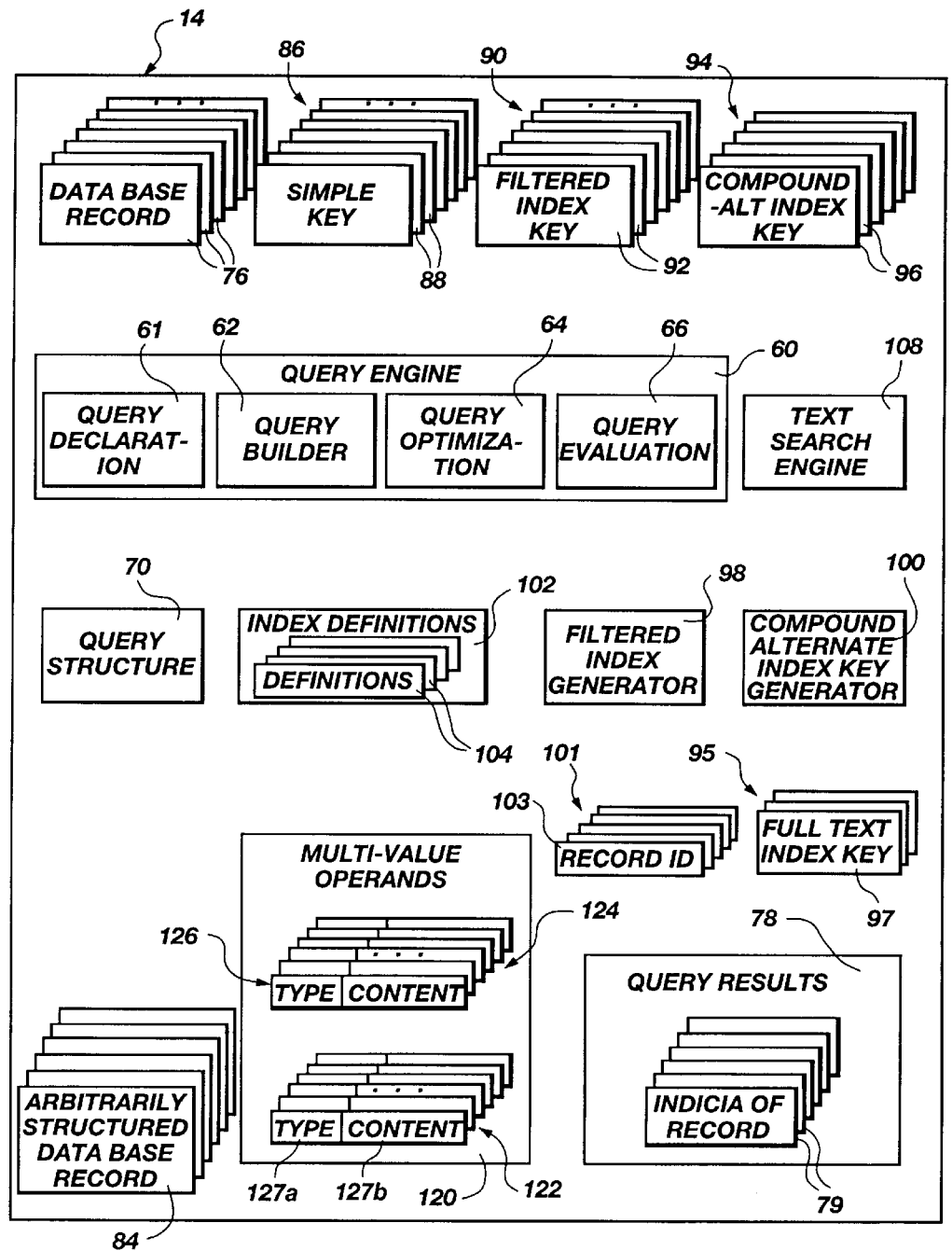
FIG. 3 is a schematic block diagram of a memory device of FIGS. 1 and 2, illustrating data and executables that may be stored therein.

Referring now to FIG. 3, a memory device 14 may contain different types of database records 76, 84. For example, database records 76 may be homogeneous. Each database record 76 may be produced according to some overriding schema applicable to all records 76. Other database records 84 may be arbitrarily structured with respect to one another.

Indices 86 comprising index keys 88 may be created and maintained. Each index key 88 may reference one or more records 76, 84 within a database.

In a method and apparatus in accordance with the invention, a filtered index 90 comprised of filtered index keys 92 may be created and maintained in the memory device 14 by a filtered index generator 98. A filtered index generator 98 may be thought of as an executable. A filtered index key 92 may reference one or more records 76, 84 in a database. Also, one or more filtered index keys 92 may reference the same record 76, 84.

In a method and apparatus in accordance with the invention, a compound alternate index 94 may be created and maintained in the memory device 14 by a compound alternate index key generator 100. A compound alternate index key generator 100 may be thought of as an executable. A compound alternate index key 96 may refer to one or more records 76, 84 in the database. Also, one or more compound alternate index keys 96 may reference the same record 76, 84.

In addition to the query engine 60 in the memory device 14, other generators and engines may be stored temporarily or permanently in a memory device 14. Given the dynamic nature of software and processors 12, an executable or data may reside in one or more memory devices 14, and may be processed in one or more processors 12. Accordingly, a memory device 14 may include multiple devices 14. Likewise, the contents of the memory device 14 may be distributed among different memory devices 14 or parceled out among such memory devices 14. Likewise, the contents of the memory device 14 may not all exist at a single moment of time. Thus, FIG. 3 should not be interpreted strictly as a state of the memory device 14. Nevertheless, in certain embodiments of an apparatus and method in accordance with the invention, some or all of the contents of the memory device 14 illustrated in FIG. 3 may reside in a memory device 14 or component devices 16, 18, 20.

Each index 86, filtered index 90, or compound alternate-key index 94 may be constructed in accordance with an index definition 104. An index generator 98, 100 operating in accordance with an index definition 104, may then produce an index 90, 94 respectively.

In an apparatus and method in accordance with the invention, a text search engine 108 may be stored in a memory device 14 and operate in a processor 12. In the apparatus 10, the query evaluation executable 66 may coordinate execution of a text search engine 108 in order to fully evaluate a query structure 70 containing selection criteria involving text search operations. The text search engine 108 may use a full text index 95 containing full text index keys 97 to satisfy text search operations in a query.

A query engine 60 may return query results 78. Query results 78 may include indicia 79 of records 76, 84 in a database. Depending on how the record retrieval API 58*c* is configured to operate, a pointer, an identifier, a field, or entire record 76, 84 may be returned in the query results 78.

In an arbitrarily structured record 84, repeating fields may exist. As a consequence, any operator in the query may receive as input, sets 122, 124 of values 126. Each value 126 in a set 122, 124 may be comprised of a type 127*a* and content 127*b*. During query evaluation, these sets 122, 124 of values 126 are temporarily stored in a memory device 14.

Figure 4:
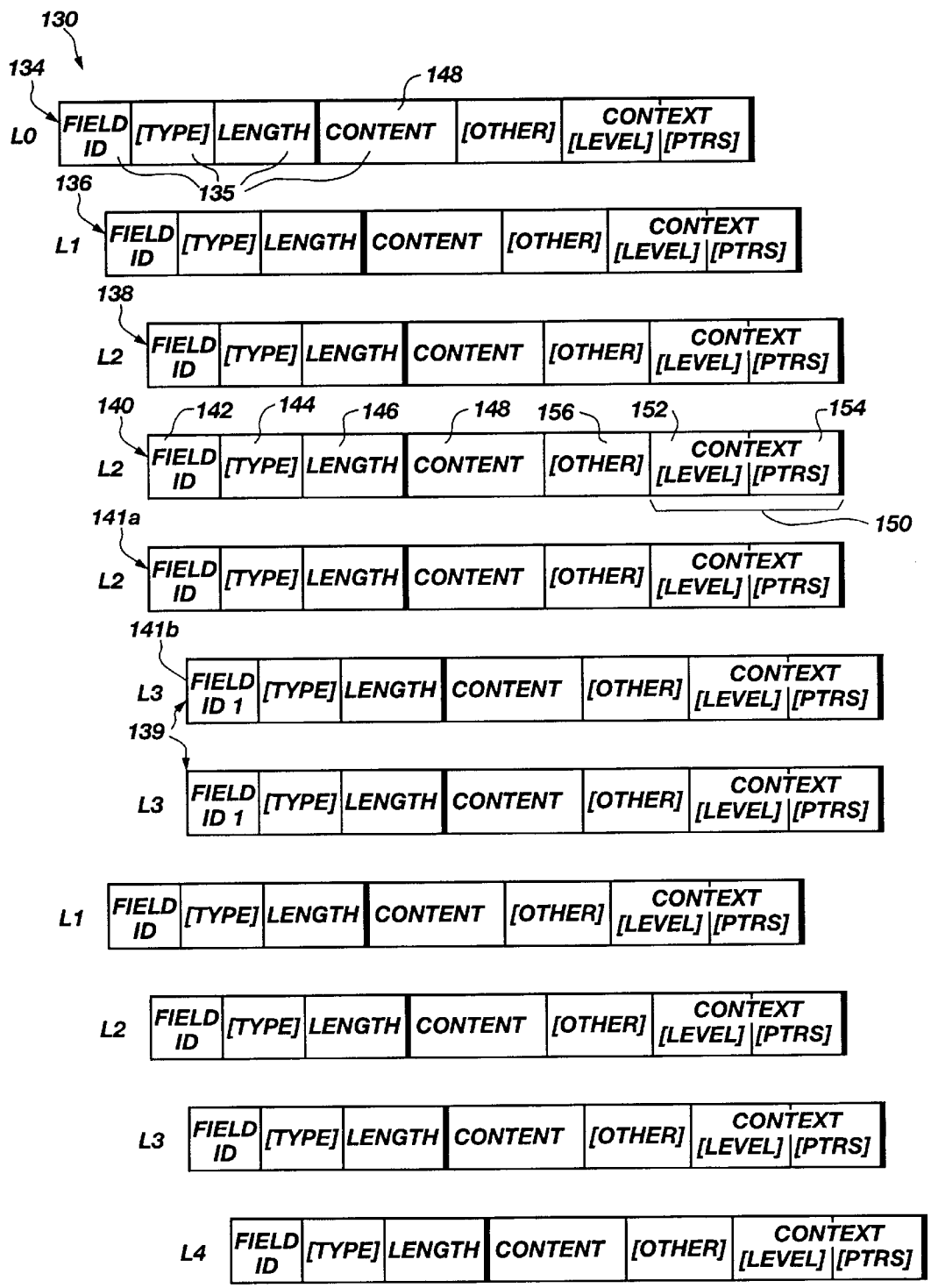
FIG. 4 is a schematic block diagram of an arbitrarily structured record, showing the details of individual fields within such a record.

Referring now to FIG. 4, in one embodiment, an arbitrarily structured record 84 (e.g., record 130) may be comprised of one or more fields 140, 134 (e.g., field). Any field 134 may have a null content 148. Inasmuch as the context 150 of each field 134 within the hierarchy of the record 130 is established within each individual field 134 for itself, a missing field presents no problem. Each field 134 is self-defining. An arbitrarily structured record 84 may lack fields present in other arbitrarily structured records 84, and contain fields 134 not contained in other arbitrarily structured records 84.

In FIG. 4, a field 140 may be comprised of a collection of segments 135 within a record 130. A field ID 142 (name, identifier, identification number, etc.) may indicate a name or other characteristic by which a field 140 may be identified. Different fields 140 may contain the same field ID 142. That is, repeating fields 139 may all contain the same field identifier 142 and may have additional information indicating a number or order held among the repeating fields.

A field type 144 may optionally be contained in a field 140. The field type 144 may define the data type (e.g., integer, string, binary) of the field content 148. A field length 146 may define the length of the contents 148 of a field 140. Each field 140 may represent an atomic unit of data, fully accessible and retrievable by a query engine 60 running in a processor 12.

A context 150 may be included in a field 140. Context 150 may include sufficient information to determine the position of a field 140 relative to other fields (134, 136, 138 . . . ) within a record 130.

In one embodiment, each field 140 may have a level number 152 to help identify context 150. The level number 152 may indicate a level of nesting (or generation level) at which the field 140 is found within the record 130. In addition, two pointers 154 may establish a relationship between the field 140 and a previous field 138 as well as a next field 141*a* within the record 130. These three pieces of information can uniquely identify the position of the field 140 in the hierarchy of the record 130. That is, a generational level 152 can be compared between proximate fields. The relative levels indicate whether a field 140 is a parent, child, sibling, or the like, with respect to a proximate field 138, 141*a*. From either of those two points, relationships to other fields (134, 136, 141*b*, . . . ) in the record 130 may be calculated.

Other segments 156 may be included in a field 140. For example, additional pointers may be desired. Any information determined by the creator of a database to be useful may be included within a segment 156 of a field 140. Nevertheless, in the currently preferred embodiment, an identification 142, length 146, value 148, and context 150 have been found suitable for clearly defining a field 140 and its context within a record 130.

Figure 5:
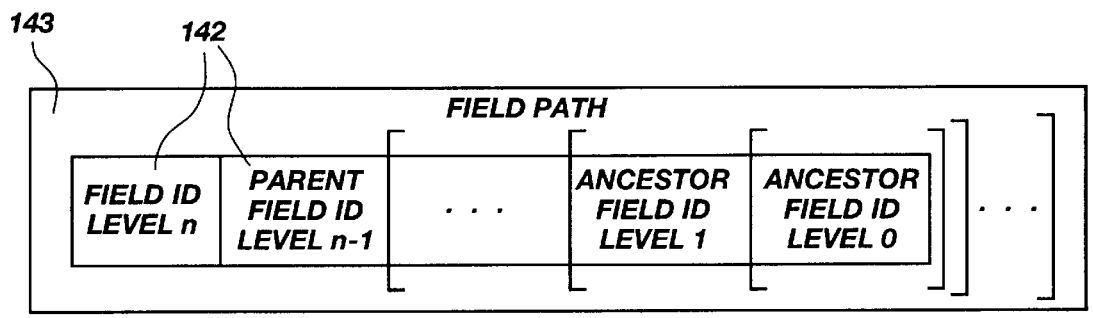
FIG. 5 is a schematic block diagram corresponding to a field path.

Referring to FIG. 5, a field path 143 may be defined for any field (134, 136, 138, . . . see FIG. 4). A field path 143 may contain a list of field identifiers 142 corresponding to a field 140, and one or more previous ancestor fields (136, 134), in a direct line of ascent. The field path 143 need not include all field IDs 142 corresponding to the entire line of ascent to the root field at level zero. However, the field path 143 must contain all field IDs 142 existing in the line of ascent between the first and last field IDs 142 in the field path 143. Alternatively, the field path 143 may be formatted according to a line of descent, in which the field ID 142 of a field 140 of interest is last in order.

Figure 6:
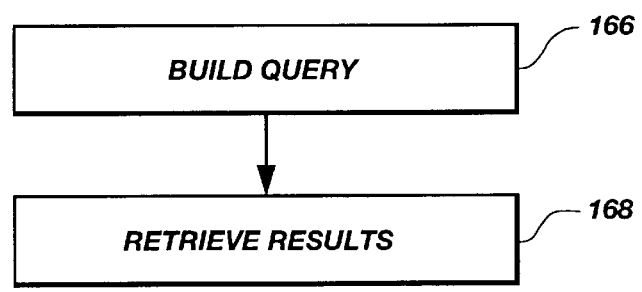
FIG. 6 is a schematic block diagram of a method in accordance with the invention, for preparing and executing queries on records within a database.

Referring now to FIG. 6, a build query step 166, may be performed by a query builder 62. A retrieve results step 168 may return indicia 79 of records 76, 84 (see FIGS. 2–3) which satisfy a query. A retrieve results step 168 may be performed by a query optimization module 64 and a query evaluation module 66.

Figure 7:
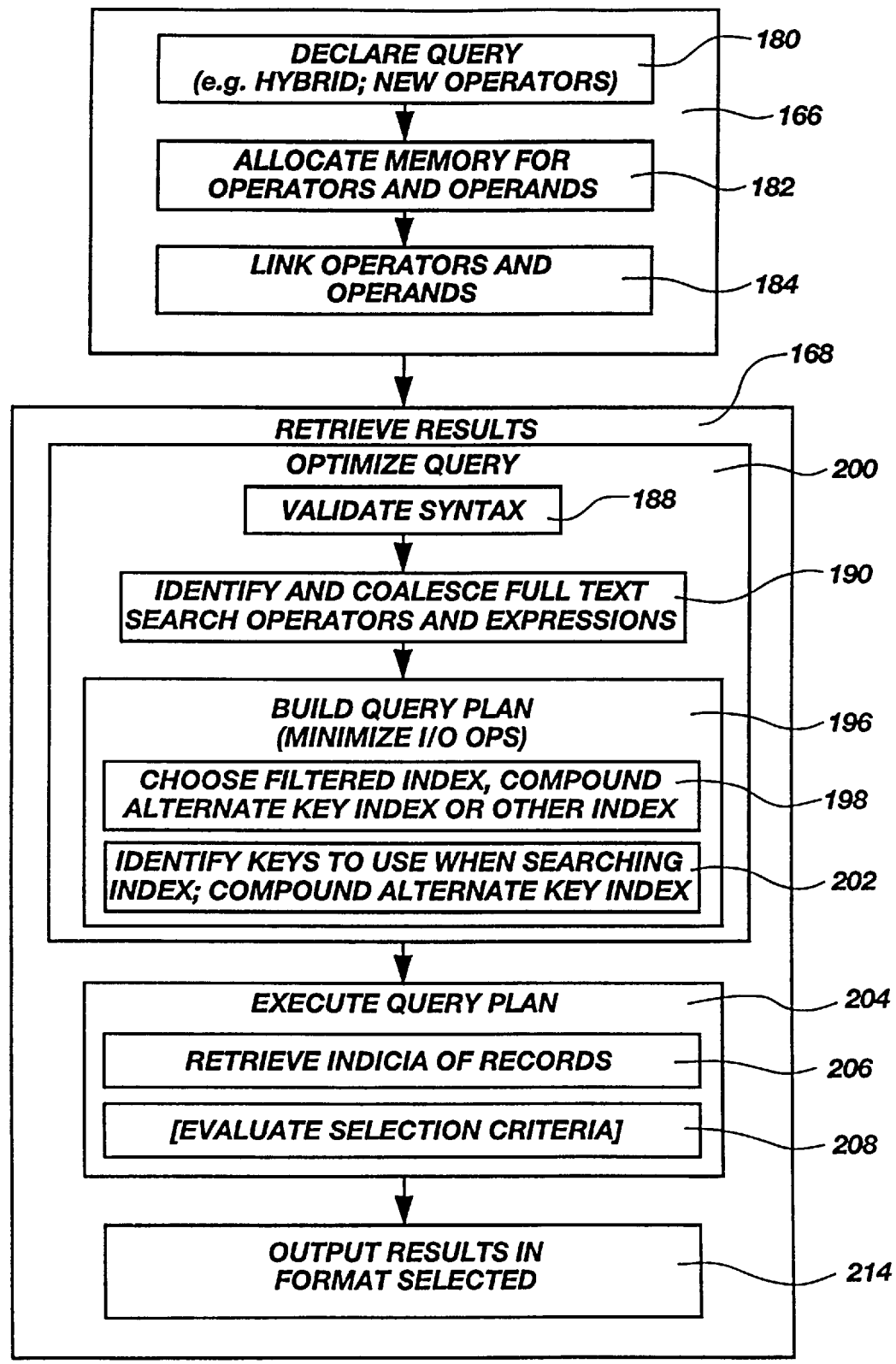
FIG. 7 is a schematic block diagram showing additional details of the steps of the method of FIG. 6.
Figure 8:
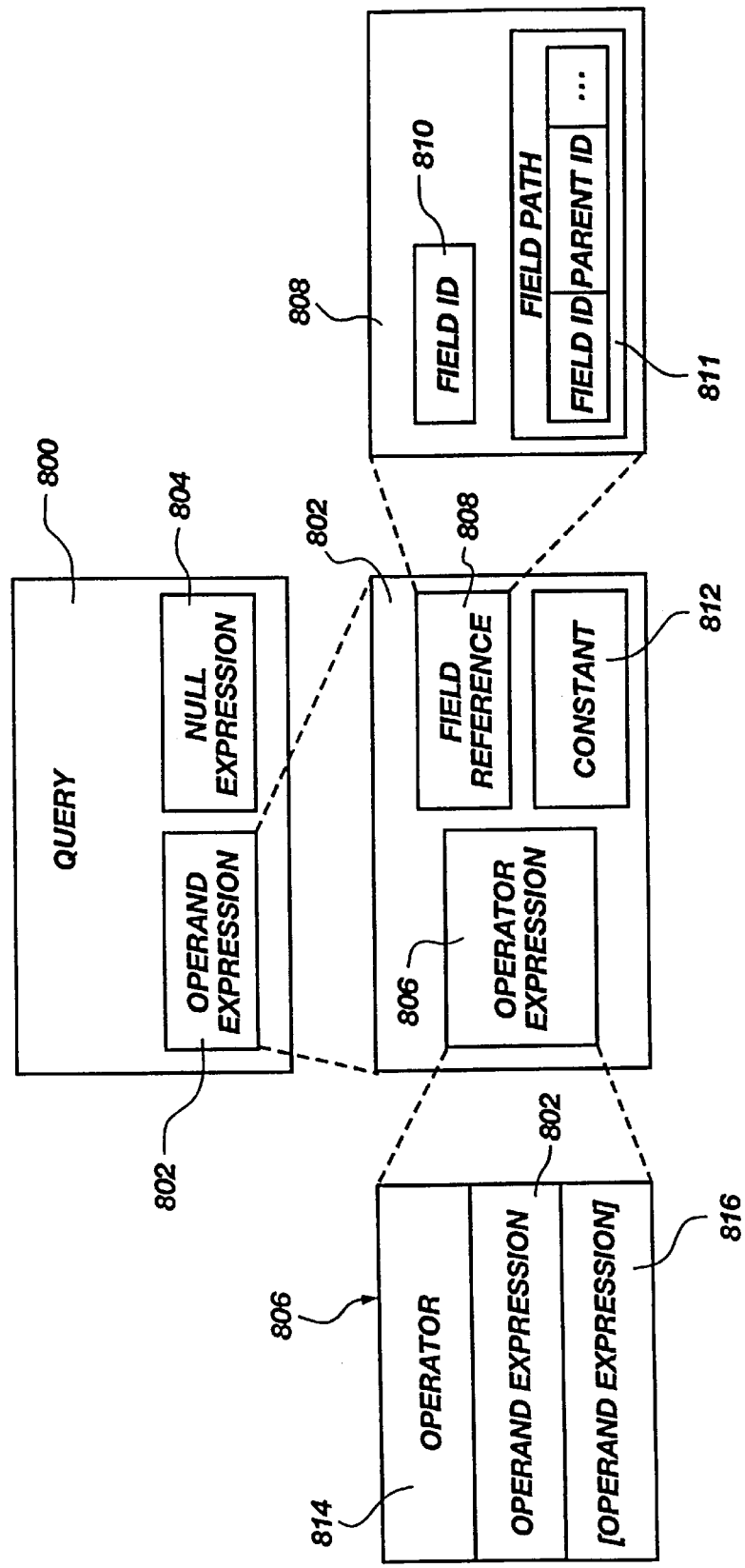
FIG. 8 is a schematic block diagram recursively depicting the components of a query that may be stored in a memory device.

Referring now to FIGS. 7 and 8, the steps for build query 166 and retrieve results 168 are illustrated in additional detail. The declare query step 180 may specify a query 800 (see FIG. 8). An allocate memory step 182 may be done as needed for each operator, each operand, and the like.

A link operators and operands step 184 may provide links between any operator 814 and its associated operand expressions 802, 816 and vice versa.

Figure 14:
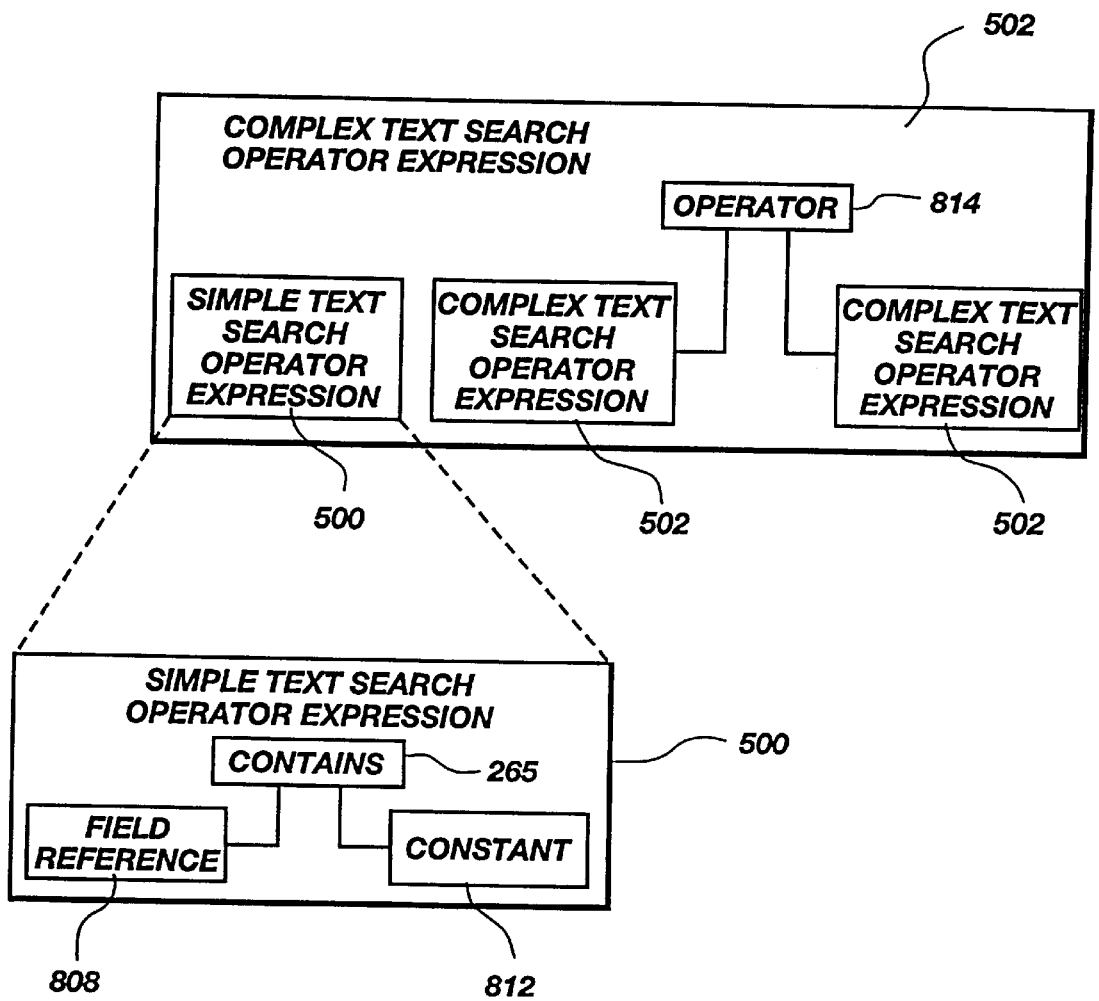
FIG. 14 is a schematic block diagram recursively depicting the components of full text search expressions that may be found within a query.

An optimize query step 200 may include a validate syntax step 188 to verify the correctness of the syntax of a query. In step 190, full text search operators and expressions may be identified and coalesced. FIG. 14 and its associated text further elaborate on this step. A build query plan step 196 may utilize other optimization techniques to build a query plan by which the query may be optimally evaluated. That is, the build query plan step 196 may generate a plan to minimize input and output operations by the processor 12 during execution of the query evaluation module 66.

A choosing step 198 may identify indices to be used by a query evaluation module 66. The choose step 198 may select a filtered index 90 to be used. Alternatively, a choose step 198 may select a compound alternate-key index 94 to be used. After choosing an index, a determination is also made as to how a selected index 86, 90, 94 is to be used. This includes a step 202 for identifying index keys 88, 92, 96 for use in finding candidate records 76, 84 to be evaluated according to the selection criteria of a query.

An execute query plan step 204 may include a retrieve record indicia step 206 to read an index key 88, 92, 96 from an index 86, 90, 94, or a record 76, 84 from a database. An evaluate selection criteria step 208 may evaluate the index keys 88, 92, 96 in an index 88, 90, 94, or the records 76, 84 in a database.

An output step 214 may output results 78 in a format selected by a user. A user may actually be a client 52 in an apparatus 10 (see FIG. 1), remote from a node 11 hosting the query engine 60 in a processor 12.

Referring now to FIG. 8, a query 800 may be either an operand expression 802 or a null expression 804. An operand expression 802 may be an operator expression 806 or a field reference 808, such as a field ID 810, a field path 811, or a constant 812.

An operator expression 806 includes an operator 814, and at least one operand expression 802. If the operator 814 is a binary operator, then the operator expression 806 will also include a second operand expression 816. If the operator expression 806 is unary, it needs only a single operand expression 802. Thus an operand expression 802 or an operator expression 806 may be recursively defined in terms of another operator expression 806 or operand expression 802, respectively.

A query 800 is evaluated by evaluating its corresponding operand expression 802 or null expression 804. Evaluating a null expression 804 is not interesting. Such an evaluation returns a single valued set 122, which contains a single {TRUE} value 126 for any candidate record 140. A {TRUE} value 126 has a type 127*a* of boolean, and a content 127*b* of TRUE.

Evaluating an operand expression 802 or an operator expression 806 yields a set 122 of values 126. The values 126 in the set 122 may include a type 127*a* and a content 127*b* of that type 127*a*.

An operand expression 802 may be evaluated in different ways dependant upon its nature. If the operand expression 802 is a field reference 808, the values 126 are extracted from a candidate record 130, by scanning the record 130 for fields 140 that have a field ID 142 matching the field ID 810 in the field reference 808, or a field path 143 matching the field path 811 in the field reference. If no field 140 is found in a candidate record 130, the operand expression 802 yields a set 122 containing a single value 126 of {UNKNOWN}. An {UNKNOWN} value 126 has a type 127*a* of UNKNOWN, and a content 127*b* of NULL.

If an operand expression 802 is a constant 812, an evaluation thereof may return a set 122 containing a single value 126 corresponding to the constant 812. If an operand expression 802 is an operator expression 806, an evaluation thereof may return a set 122 containing one or more values 126.

When an operator expression 806 is evaluated, each operand expression 802 in the operator expression 806 is evaluated as described above to obtain a set 122 of values 126 corresponding thereto. The operation corresponding to the operator 814 in the operator expression 806 is then performed on the set 122 or sets 122 of values 126 as described below.

Figure 10:
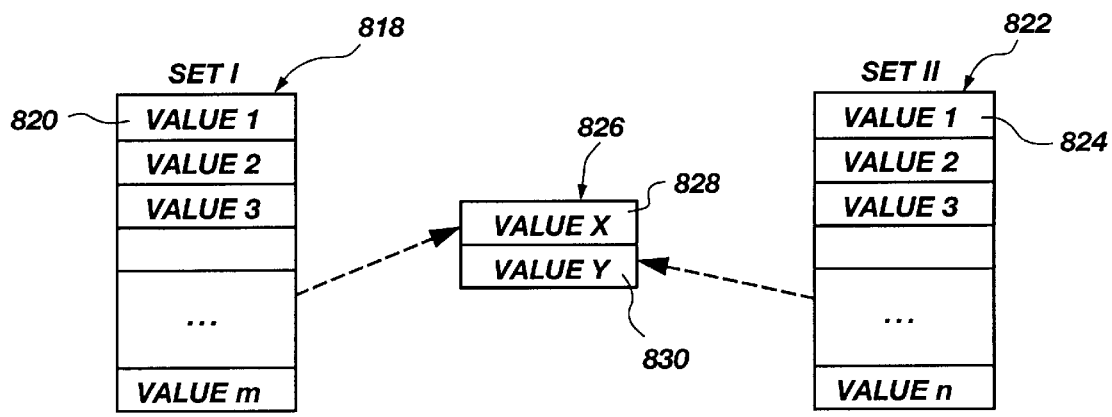
FIG. 10 is a schematic block diagram depicting a method in accordance with the invention, for performing an operation on two sets of multiple values.

Binary operators 814 have two operand expressions 802, 816, each of which may be evaluated to yield a set 122 of values 126. Referring to FIG. 10, such evaluations may yield a set 818 of values 820 corresponding to the first operand expression 802 (FIG. 8) and another set 822 of values 824 corresponding to the second operand expression 816 (FIG. 8). A value pair 826 is formed to include one value 828 from the set 818 and one value 830 from the set 822. If the set 818 includes m values 820, and the set 822 includes n values 824, then m*n value pairs 826 may be formed.

For each value pair 826, a binary operation represented by the binary operator 814 is performed on the constituent values 828, 830 of the value pair 826. For each value pair 826, this operation yields a single value 126, which is added to the set 122 of resulting values 126 for that binary operator expression 806. The value 126 is added to the set 122 only if distinct from all other values 126 in the set 122.

If the operator 814 in an operator expression 806 is a division (/) operator 250 or a modulo (MOD) operator 252, and the second constituent value 830 (the divisor) is zero, the resulting value will be {UNKNOWN}. In addition, if one or both of the constituent values 828, 830 of the value pair 826 is {UNKNOWN}, the resulting value 126 will also be {UNKNOWN}, except for certain cases described below.

There are two principal exceptions in one currently preferred embodiment of an apparatus and method in accordance with the invention. If the operator 814 is an OR operator 232, and one constituent value 828, 830 is {TRUE}, and the other constituent value 830, 828 is {UNKNOWN}, the resulting value 126 is {TRUE}. If the operator 814 is an AND operator 230, and one constituent value 828, 830 is {FALSE}, and the other constituent value 830, 828 is {UNKNOWN}, the resulting value 126 is {FALSE}.

For unary operators 814, a single operand expression 802 is evaluated. For each value 126 in the resulting set 122, the operation corresponding to (represented by) the operator 814 may be performed on that value 126. In such a case, the operation may yield a single value 126, which is added to the set 122 of resulting values 126 for that unary operator expression 806. The value 126 is added to the set 122 only if distinct from all other values 126 currently in the set 122.

Figure 9:
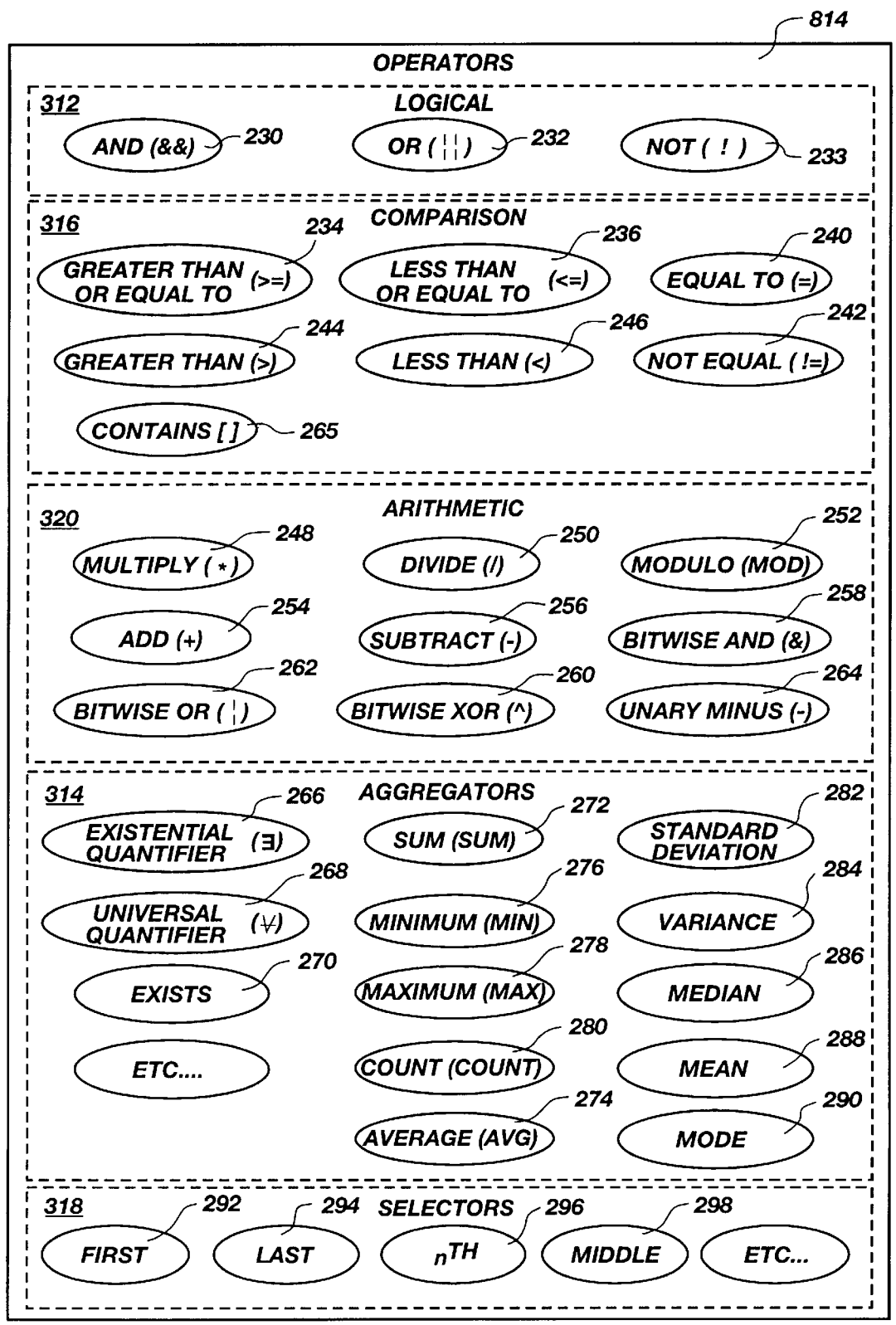
FIG. 9 is a schematic block diagram illustrating certain operators that may be used in an operator expression of FIG. 8.

Referring to FIG. 9, an apparatus and method in accordance with the invention supports several different types of operators. Operators 814 may include logical operators 312 (e.g., 230–233), comparison operators 316 (e.g., 234–246, 265), and arithmetic operators 320 (e.g., 248–264), as well as aggregators 314 (e.g., 266–290), and selectors 318 (e.g., 292–298) discussed later. In accordance with the invention, logical 312, comparison 316, and arithmetic operators 320 are adapted to operate on sets 122 of values 126 as described above.

However, aggregators 314 and selectors 318 operate differently when operating on sets 122 of multiple values 126. Aggregators 314 and selectors 318 are unary operators 814, requiring only a single operand expression 802. Aggregators 314 and selectors 318 may receive as input an entire set 122 of values 126, returning another set 122 containing a single value 126.

Typically, aggregators 314 combine the values 126 from a set 122 to produce a single resulting value 126. For example, a COUNT aggregator 280 returns the number of values 126 in a set 122 of values 126.

Typically, selectors 318 extract a single value 126 from a set 122. For example, a FIRST selector operator 292, extracts the first value 126 in the set 122.

In one presently preferred embodiment of an apparatus and method in accordance with the invention, an aggregator 314 or a selector 318 may also evaluate a set 122 of values 126 where one of the values 126 is UNKNOWN. Depending on the operator 814 (e.g. 314, 318) the resulting value 126 may or may not be UNKNOWN. For example, a COUNT operator 280 may still return a count value, but a SUM operator 272 may return an UNKNOWN. In another example, a selector operator 318 such as a FIRST operator 292, may return an UNKNOWN value 126 only if the first value 126 in the set 122 is UNKNOWN.

Figure 11:
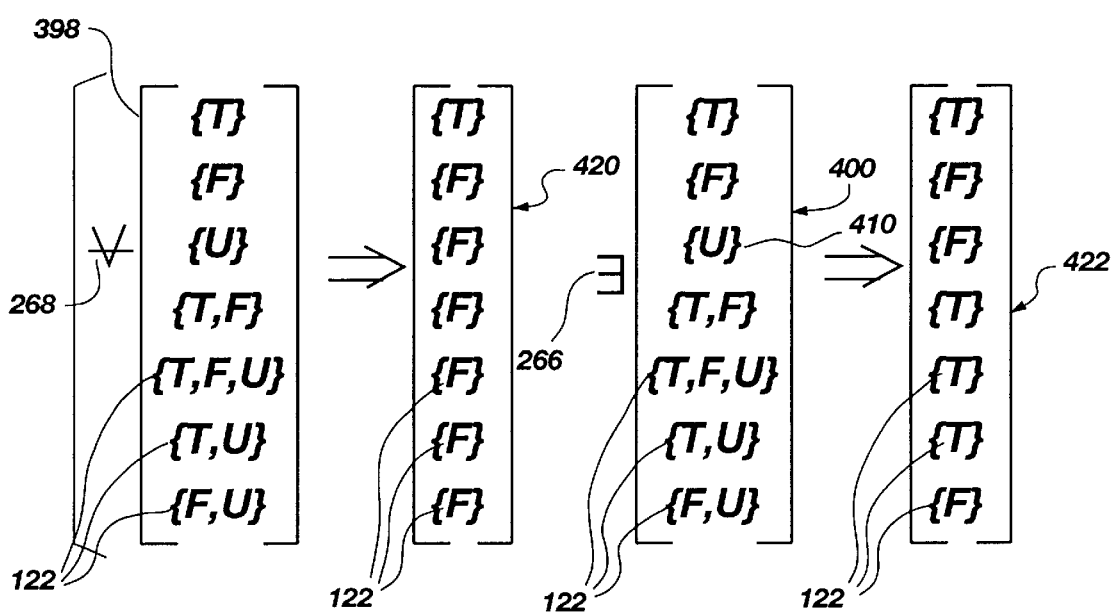
FIG. 11 is a schematic block diagram illustrating the results of evaluation by the quantifier operators.

Referring now to FIG. 11, the operation of the universal quantifier operator 268 (see FIG. 9) and the existential quantifier operator 266 (see FIG. 9) are illustrated. The enumeration 398 of sets 122 represents possible inputs to the universal quantifier operator 268. The enumeration 420 of resulting sets 122 represents the corresponding outputs from the universal quantifier operator 268.

The enumeration 400 of sets 122 represents possible inputs to the existential quantifier operator 266. The enumeration 422 of resulting sets 122 represents the corresponding outputs from the existential quantifier operator 266.

In an apparatus and method in accordance with the invention, an EXISTS operator 270 may be provided to test for the existence of a specified field within a record. An implicit EXISTS operator 270 (see FIG. 9) may also be implemented in a simplified syntax. For example, for a query 800 (see FIG. 8) that is an operand expression 802, wherein the operand expression 802 is a field reference 808, the operand expression 802 is implemented as an implied (implicit) EXISTS operator 270 operating on the field reference 808, as described below.

Another example of an implicit EXISTS operator 270 may occur if the operator 814 in an operator expression 806 is a logical operator 812 and at least one of the operand expressions 802, 816 pertaining thereto is a field reference 808. In such a case, any operand expression 802 or expressions 802, 816 that are field references 808 are implemented as implied (implicit) EXISTS operators 270 operating on the respective field references 808, as described below.

In evaluating an operator expression 806 involving an EXISTS operator 270, or an operand expression 802 that is interpreted as an implicit EXISTS operator 270, a candidate record 130 is scanned for fields 140 that have a field ID 142 matching the field ID 810 in the field reference 808, or a field path 143 matching the field path 811 in the field reference. If such a field 140 is found in the candidate record 130, the operand expression 802 returns a set 122 containing a single value 126 of {TRUE}. Otherwise, the operand expression 802 returns a set 122 containing a single value 126 of {FALSE}.

Figure 12:
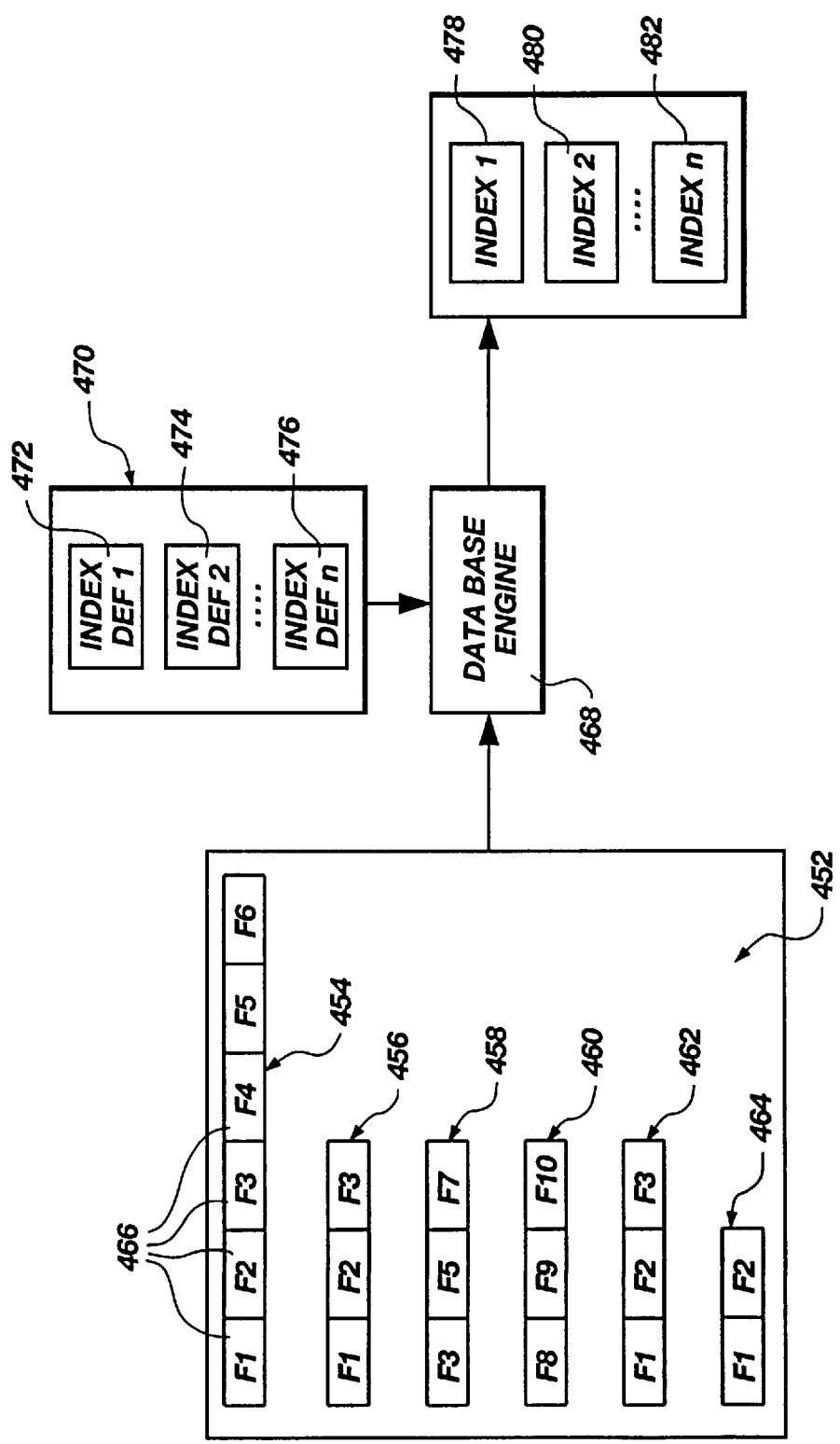
FIG. 12 is a schematic block diagram illustrating creation of indices in a database maintained by a database engine in accordance with the invention.

Referring now to FIG. 12, in general, a heterogeneous database 452 may include any number of arbitrarily structured records 454, 456, 458, 460, 462, 464. A database engine 468 is typically tasked with creation and maintenance of indices 88, 90, 94 (see FIG. 3). A database engine 468 operating on a processor 12, may rely on index definitions 470 as inputs. For each index definition 472, 474, 476 a corresponding index 478, 480, 482, may be created.

Figure 13:
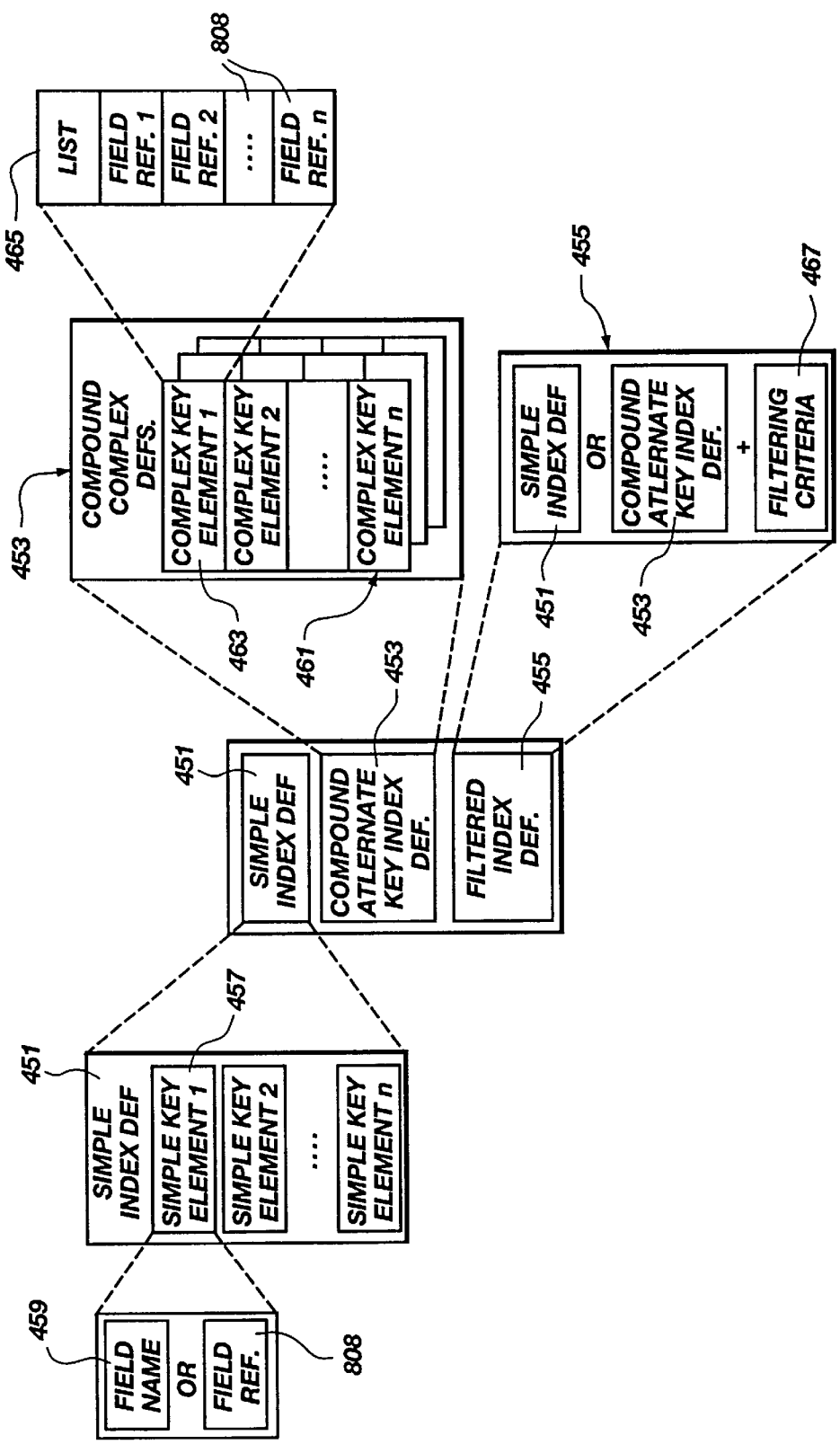
FIG. 13 is a schematic block diagram illustrating a data structure for simple index definitions, compound alternate index definitions, and filtered index definitions.

Referring to FIG. 13, and also FIGS. 3 and 12, index definitions 470 may be simple index definitions 451. In an apparatus and method in accordance with the invention, an index definition 470 may be a compound alternate-key index definition 453 or a filtered index definition 455. Compound alternate-key index definitions 453 and filtered index definitions 455 may both apply to a heterogeneous database 452. However, in one embodiment, a compound alternate-key index definition 453 and a filtered index definition 455 may also be implemented in a homogenous database.

Typically, a simple index definition 451 enumerates one or more simple key elements 457. A simple key element 457 is typically a field name 459 in the prior art, but may also be a field reference 808 (see FIG. 7) in the apparatus 10. If only a single simple key element 457 is indicated, a simple index definition 451 effectively instructs the database engine 468 to create an index key 87 (see FIG. 3) comprised of the contents of the indicated field from a record 76, 84 being processed. If more than one simple key element 457 is indicated, the simple index definition 451 effectively instructs the database engine 468 to create an index key 87 by concatenating the contents of the indicated fields from a record 76, 84 being processed.

In one presently preferred embodiment of an apparatus in accordance with the invention, a new type of index definition 470, a compound-alternate key index definition 453, may be created and applied. A compound alternate key index definition 453 may include one or more compound complex definitions 461, each of which may effectively instruct the database engine 468 in an alternate way to create an index key 87 (e.g. 96).

Typically, a compound complex definition 461 enumerates one or more complex key elements 463. A complex key element 463 is typically a list 465 of one or more field references 808 (see FIG. 8). If only a single complex key element 463 is indicated, a database engine 468 may traverse the list 465 of field references 808 in the complex key element 463. For each field reference 808, the database engine 468 may scan the record 76, 84 being processed to find occurrences of fields 140 corresponding to the field reference 808. For each occurrence found, the database engine 468 may build an index key 96 from the contents of the field 140.

If more than one complex key element 463 is indicated in a complex compound definition 461, a database engine 468 is effectively being instructed to build one or more compound index keys. A compound index key is an index key 87 that is a concatenation of multiple elements, each of which contains the contents of a field 140.

To build a compound index key, the database engine 468 may extract all values corresponding to each complex key element 463 in the complex compound definition 461. This may be accomplished by traversing each list 465 of field references 808 corresponding to each complex key element 463. For each field reference 808, in each list 465, the database engine 468 may scan the record 76, 84 being processed to find occurrences of fields 140 corresponding to the field reference 808. Once all the values are extracted for each complex key element 463, all possible compound index keys are constructed by concatenating all combinations of values for each complex key element 463.

Another new type of index definition 470, a filtered index definition 455, may be created and applied. In one embodiment, a filtered index definition 455 may be a simple index definition 451 or a compound alternate key definition 453, with additional filtering criteria 467. The additional filtering criteria 467, may be used by the database engine to determine whether a record 76, 84 being processed should be indexed. In one embodiment, the filtering criteria 467 are essentially the same as selection criteria that may be declared in a query 800. As such, the record 76, 84 being processed is evaluated against the filtering criteria to determine whether the record 76, 84 satisfies the filtering criteria 467. If the record 76, 84 satisfies the filtering criteria 467, the record 76, 84 will be indexed in accordance with the methods described above for a simple index definition 451 or a compound alternate-key index definition 453.

Referring now to FIGS. 8 and 14, a query 800 may be a hybrid query if it contains at least one operator expression 806 that is a simple text search operator expression 500. A simple text search operator expression 500 is an operator expression 806 whose first operand expression 802 is a field reference 808, whose operator 814 is the CONTAINS 265 operator, and whose second operand expression 816 is a constant 812. In one embodiment, such an expression may be evaluated by scanning the record 130 for fields 140 that have a field ID 142 matching the field ID 810 in the field reference 808, or a field path 143 matching the field path 811 in the field reference. For each such field 140 found, the contents of the field 148 may be scanned by the text search engine 108 for words matching the constant 812 in the simple text search operator expression 500 referred to above If such a word is found in the field's content, the simple text search operator expression 500 returns a set 122 containing a single value 126 of TRUE. A word may be thought of as a substring of characters in the field's content 148 that is delimited from other sub-strings in the field's content 148 using delimiter characters (typically spaces, tabs, carriage returns, punctuation marks, etc.).

In another embodiment, the full text search engine 108 may employ a full text index 95 to generate a list 101 of record IDs 103, or other indicia, referred to as a hit list 101. The record IDs 103 in the list 101 are those that satisfy the criteria of the simple text search operator expression 500. If the record ID 103 corresponding to the record 130 currently being evaluated is found in this hit list 101, then the simple text search operator expression 500 returns a set 122 containing a single value 126 of {TRUE}.

In another embodiment, the query optimizer 64 may coalesce multiple simple full text operator expressions 500, embedded in the query 800, into one or more complex text search operator expressions 502. This may be done by applying standard transformation theorems (e.g. associativity, commutativity, DeMorgan's theorem, etc.) defined by first order predicate calculus to the query 806 to reorganize (regroup) the operator expressions 806 in the query 800.

The full text search engine 108 (see FIG. 3) may employ a full text index 95 to generate a hit list 101 of record IDs 103 that satisfy the criteria of the complex text search operator expression 502. If the record ID 103 corresponding to the record 130 currently being evaluated is found in this hit list 101, then the complex text search operator expression 500 returns a set 122 containing a single value 126 of {TRUE}.

The reason for coalescing simple text search operator expressions 500 into complex text search operator expressions 502, is to enable the full text search engine 108 to perform a single search to generate a hit list 101 for multiple single text search operator expressions. This may have the effect of minimizing the input and output (I/O) operations to and from a storage device 16 (e.g., disk).

This ability to evaluate multiple independent simple text search operation expressions 500 as well as multiple independent complex text search operator expressions that may be embedded anywhere within a query 800 of arbitrary complexity is not available in prior art systems. Typically, prior art systems are restricted to merging (intersecting, forming union of) a result of a full text search query with that of a traditional database query.

In prior art database systems, a join is a cross product of multiple sets of records, each set being homogeneous, containing records of a single type. In an apparatus and method in accordance with the invention, the operation of joining can be executed by the query engine 60 for multiple sets of arbitrarily structured records 84. A join operation may be thought of as performing a cross product on the elements (records 84) in each heterogeneous set. Because the records 84 in the sets may be arbitrarily structured, the resulting set of records 84 of a join operation is another heterogeneous set of arbitrarily structured records.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for formulating and executing a hybrid query on a database comprising records, the apparatus comprising a digital computer having a processor operably connected to a memory device storing modules executable on the processor and data structures containing data associated with the modules, the modules and data structures comprising:

the records stored in the memory device, a record of the records comprising a text field of arbitrary size and a database field, pre-defined to contain conventional database data;

the database further comprising a full-text index for identifying the text field and a database index for identifying the database field;

a hybrid query structure, stored in the memory device, having a full-text selection criterion, in a first predicate corresponding to the full-text index, and a non-full-text selection criterion, in a second predicate corresponding to the database index;

a query engine module stored in the memory device to be executable by the processor for building the hybrid query structure and retrieving indicia of records satisfying the query.

2. The apparatus of claim 1, wherein the database further comprises an alternate-key index.

3. The apparatus of claim 2, wherein the alternate-key index is a compound alternate-key index.

4. The apparatus of claim 2, wherein the alternate-key index is a simple alternate-key index.

5. The apparatus of claim 2, wherein the alternate-key index is a simple alternate-key filtered index.

6. The apparatus of claim 2, wherein the alternate-key index is a compound alternate-key filtered index.

7. The apparatus of claim 1, wherein the database further comprises a filtered index.

8. The apparatus of claim 1, wherein the records are arbitrarily structured records.

9. A method of formulating and executing a hybrid query against records in a database, the method being implemented in a query engine, the query engine being executable by a processor operably connected to a memory device, and the method comprising the following steps executed in an order and repetition determined by the query engine:

providing records in a database, a record of the records comprising a text field of arbitrary size and a standard database field, pre-defined to contain conventional database data;

the database further comprising a full-text index for identifying the text field and a database index for identifying the database field;

building, in a memory device, a hybrid query structure having a full-text selection criterion corresponding to the text field, a non-full-text selection criterion corresponding to the standard database field, and information defining a hybrid query;

retrieving indicia of records from the database in accordance with the query structure;

evaluating each of the indicia according to the selection criterion to determine whether the indicia satisfy the selection criterion; and returning selected indicia that satisfy the selection criterion.

10. The method of claim 9, wherein the the database comprises and index selected from the group consisting of:

a full-text index;

an alternate-key index;

a compound alternate-key index;

a simple alternate-key index;

a simple alternate-key filtered index;

a compound alternate-key filtered index; and a filtered index.

11. The method of claim 9, wherein the records are arbitrarily structured records.

12. A memory device storing data structures corresponding to a hybrid query, the data structures comprising:

indicia structures containing indicia of records in a database;

the records, further comprising a text field of arbitrary size and a database field, pre-defined to contain conventional database data;

the database further comprising a full-text index for identifying the text field and a database index for identifying the database field;

a hybrid query structure having a full-text selection criterion corresponding to the text field and a non-full-text selection criterion corresponding to the database field;

a query engine structure executable by a processor for building the hybrid query structure and retrieving indicia structures corresponding to selected records satisfying the query.

13. The apparatus of claim 12, wherein the database comprises one or more indices selected from the group consisting of:

a full text index;

an alternate-key index;

compound alternate-key index;

a simple alternate-key index, simple alternate-key filtered index;

a compound alternate-key filtered index; and a filtered index.

14. The memory device of claim 12, wherein the records are arbitrarily structured records.

15. The memory device of claim 12, wherein the query engine structure contains executables to build the query structure, retrieve indicia of records from the database in accordance with the query structure, evaluate each of the indicia to determine whether such indicia satisfy the query criterion, and return selected indicia satisfying the criterion, all in an order and repetition determined by the query engine structure during execution thereof.

* * * * *